(12) United States Patent
Myr

(10) Patent No.: US 6,480,783 B1
(45) Date of Patent: Nov. 12, 2002

(54) REAL TIME VEHICLE GUIDANCE AND FORECASTING SYSTEM UNDER TRAFFIC JAM CONDITIONS

(75) Inventor: David Myr, Jerusalem (IL)

(73) Assignee: Makor Issues and Rights Ltd., Jerusalem (IL)

( * ) Notice: Subject to any disclaimer, the term of this patent is extended or adjusted under 35 U.S.C. 154(b) by 0 days.

(21) Appl. No.: 09/528,134

(22) Filed: Mar. 17, 2000

(51) Int. Cl.[7] .................... G06F 165/00; G08G 1/09; H04Q 7/00

(52) U.S. Cl. ................ 701/117; 701/118; 340/995; 340/990

(58) Field of Search ................ 701/117, 118, 701/119, 213, 200, 201, 210, 211, 209, 207, 208; 340/995, 905, 989, 990, 991, 993, 994; 455/507, 509, 457

(56) References Cited

U.S. PATENT DOCUMENTS

| 4,954,958 A | | 9/1990 | Savage et al. ............... 364/444 |
| 5,058,201 A | * | 10/1991 | Ishii et al. ..................... 455/33 |

(List continued on next page.)

FOREIGN PATENT DOCUMENTS

| DE | 195 47 574 A1 | 10/1996 |
| EP | 0 903 916 A2 | 3/1999 |
| FR | 2 762 906 | 11/1998 |
| WO | WO 95/21435 | 8/1995 |
| WO | WO 98/27525 | 6/1998 |

Primary Examiner—Tan Nguyen
Assistant Examiner—Dalena Tran
(74) Attorney, Agent, or Firm—Stanley N. Protigal; Elman & Associates

(57) ABSTRACT

A system and method for real time vehicle guidance by Central Traffic Unit are presented. The proposed vehicle Guidance System includes a plurality of vehicles equipped with Individual Mobile Units including GPS units (position determining systems adapted to determine their present position) and communicatively linked to the Central Traffic Unit computer server. The Central Traffic Unit broadcasts the updated traffic patterns in real time thereby enabling the Individual Mobile Units to dynamically calculate the desired optimal travel paths. In response to a request from a driver for a route update from his present position to a desired destination, the Individual Mobile Unit searches for an optimal (usually fastest) route and shows it to the driver. In route searching by the minimal time criterion, the Individual Mobile Unit relies on estimated travel times stored in its database, and may also use current real time information on bottleneck situations received from Central Traffic Unit. The forecasting system allows the driver to enter alternative time schedules for the same destination and receive alternative travel time estimates for the same destination depending on the estimated traffic volumes on the roads at that particular time. The backbone of the system is a group of Sample Mobile Units equipped with RF transmitters that communicate their present position to the Central Traffic Unit at predetermined time intervals. The Central Traffic Unit uses those sample vehicles as antennas by tracking their positions for creating and maintaining a network of real time traffic load disposition in various geographical areas. To be able to detect a bottleneck situation when it arises and to estimate a current travel time for a corresponding section of road, the Central Traffic Unit maintains a list of sample vehicles that recently exited that section. If the times those vehicles have spent on the section differ considerably from a regular time stored in the database, Central Traffic Unit uses statistical tools for forecasting the future travel time along this section. Simultaneously, the Central Traffic Unit broadcasts updated travel times and any new information on current traffic jams and slow-down bottleneck situations in a given geographical location.

23 Claims, 29 Drawing Sheets

U.S. PATENT DOCUMENTS

| | | | | |
|---|---|---|---|---|
| 5,187,810 A | * | 2/1993 | Yoneyama et al. | 455/34.1 |
| 5,420,794 A | * | 5/1995 | James | 364/436 |
| 5,539,645 A | * | 7/1996 | Mandhyan et al. | 364/438 |
| 5,543,789 A | | 8/1996 | Behr et al. | 340/995 |
| 5,610,821 A | * | 3/1997 | Gazis et al. | 364/444.2 |
| 5,699,056 A | * | 12/1997 | Yoshida | 340/905 |
| 5,797,330 A | * | 8/1998 | Li | 104/28 |
| 5,822,712 A | * | 10/1998 | Olsson | 701/117 |
| 5,911,773 A | * | 6/1999 | Mutsuga et al. | 701/200 |
| 5,919,246 A | | 7/1999 | Waizmann et al. | 701/209 |
| 5,928,294 A | * | 7/1999 | Zelinkovsky | 701/204 |
| 6,150,961 A | * | 11/2000 | Alewine et al. | 340/995 |
| 6,163,751 A | * | 12/2000 | Van Roekel | 701/210 |
| 6,216,088 B1 | * | 4/2001 | Schulz et al. | 701/209 |

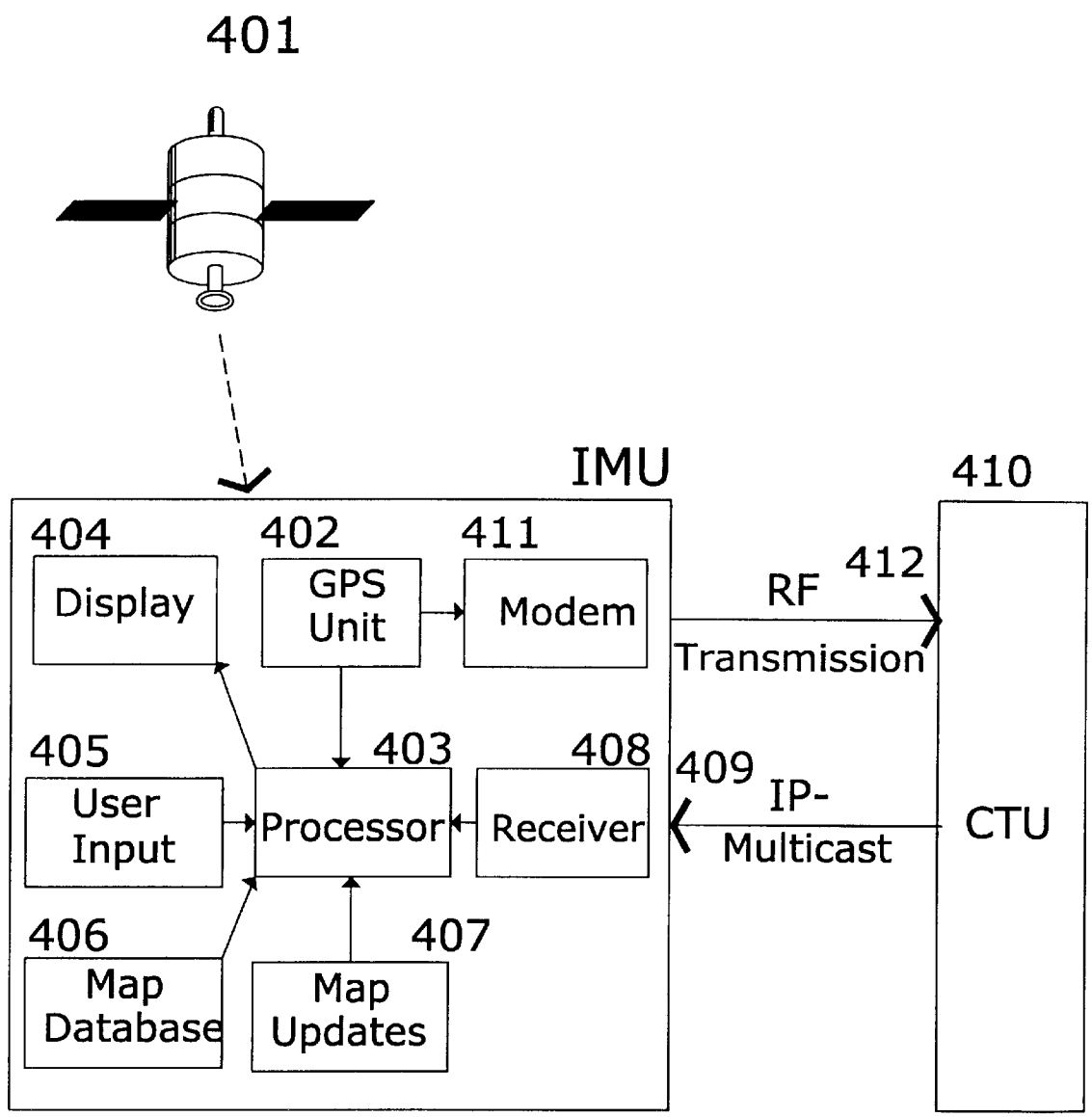

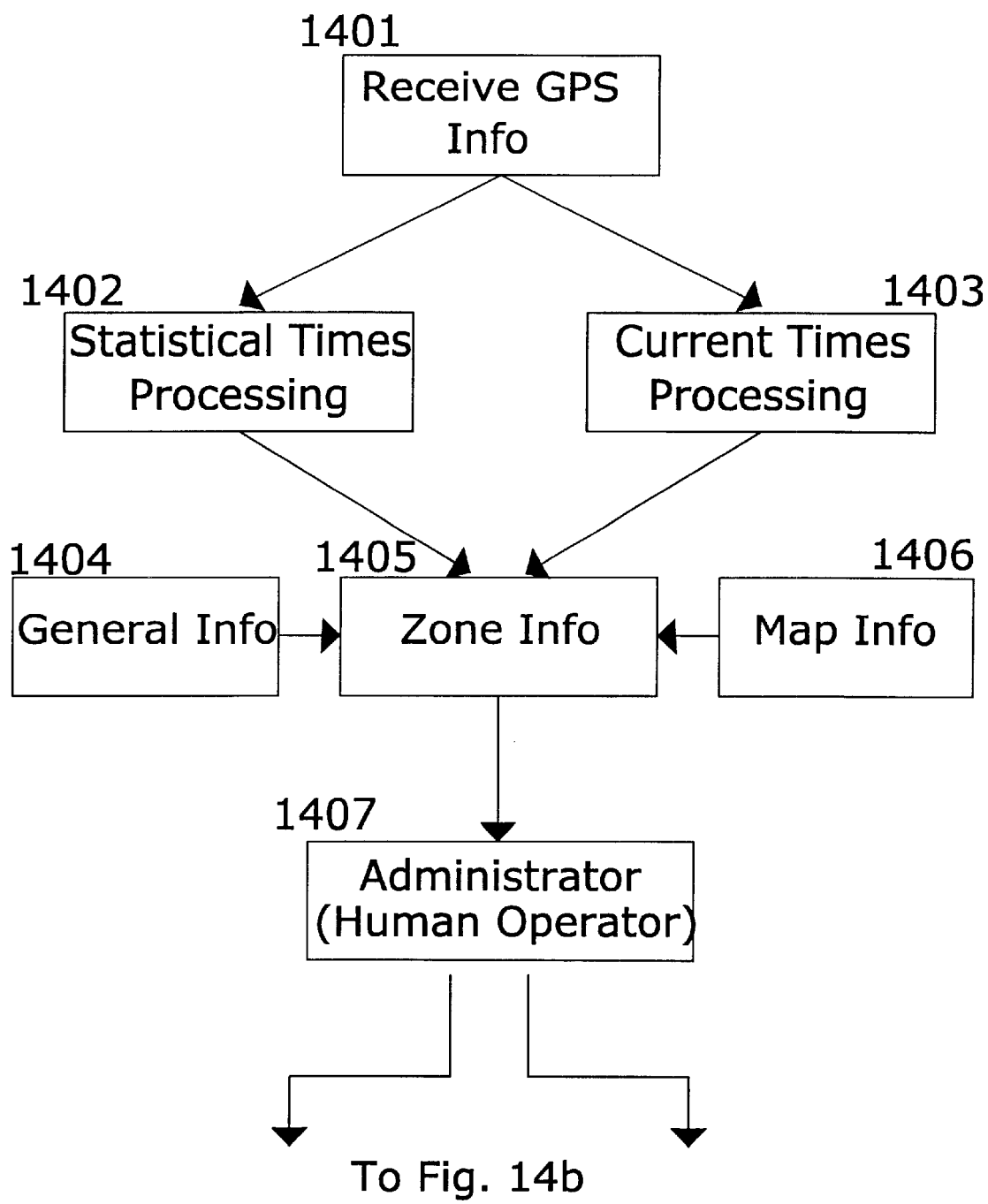

Fig. 21
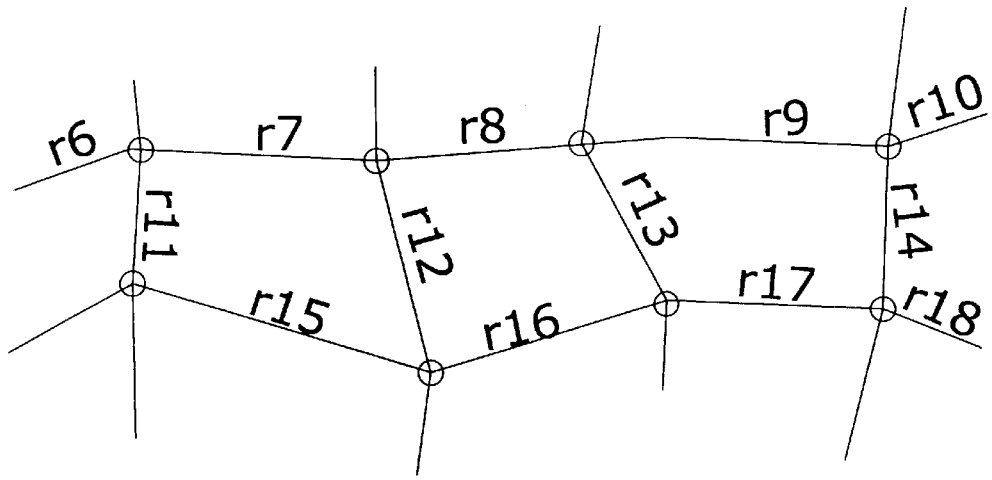
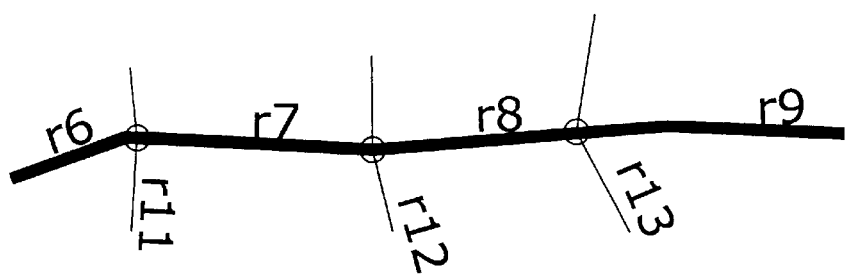
Exit List-r7
| ID. | Exit Queque Times | Current Travel Times |
|---|---|---|
| V1 | 7:15-7:22 | 7 |
| V2 | 7:28-7:45 | 17 |
| V3 | 7:50-8:15 | 25 |
| Vn | Predicted time tn | |
Exit List-r8
| ID. | Exit Queque Times | Current Travel Times |
|---|---|---|
| V1 | 8:15-8:30 | 15 |
| V2 | 8:20-8:45 | 25 |
| V3 | 8:40-9:10 | 30 |
| Vn | Predicted time tn | |

REAL TIME VEHICLE GUIDANCE AND FORECASTING SYSTEM UNDER TRAFFIC JAM CONDITIONS

BACKGROUND OF THE INVENTION

1. Field of the Invention

The present invention describes the vehicle Guidance System consisting of a plurality of vehicles equipped with IMUs including GPS units and of the CTU computer. The CTU broadcasts the updated traffic data collected from a number of sample vehicles via Multicast Broadcasting System thereby enabling the IMUs to dynamically update the desired optimal travel routes.

2. Description of the State of Art

The conventional on-vehicle guidance systems are usually stand-alone applications wherein the traffic data are static and cannot be easily dynamically updated. Consequently, the proposed routes are accurate only under ideal traffic conditions. The stand-alone versions cannot take into account current traffic jam conditions or real time emergencies. Hence, even when a so-called 'optimal route' is found, it may not be usable solution in real time situations and can only be used as a general recommendation.

Other systems rely on electronic and optical sensors situated at various key locations to measure and update the current traffic loads. These systems are typically costly to install and to maintain and to be effective they must be distributed over large sectors of roads. Still other real time traffic control systems utilize real time field information typically gathered from various service vehicle such as traffic police, ambulances, road maintenance teams, etc. which is usually transmitted by radio to the control center and from there broadcasted to the public.

The present invention eliminates the need for a large number of static sensors and relies instead on a number of highly mobile GPS carrying sample vehicles. Naturally, the reliability of the results will depend on the size of the sample vehicle fleet, and the ability of the server to process the incoming information simultaneously. Similar ideas could be found in existing inventions. Of particular relevance is U.S. Pat. No. 5,699,056 wherein the problem statement is similar to ours. In particular, it formulates the problem of dealing with traffic jams and other bottleneck situations. For detecting traffic jams and representing them in its database, this patent uses data obtained from traveling vehicles, in particular their IDs, positions, times, and speeds. In Embodiment 2, it divides all the vehicles into blocks (i.e. groups), measures average speed in each block, and defines a situation as a jam if the average speed is less than a predetermined value.

In our view, the proposed there solution contains a number of problematic points that require further development and which remained unclear in the patent description. 1) The definition of blocks is not quite clear. No algorithm is given for partitioning the vehicles into blocks; 2) The number of roads or more precisely, sections of roads may be very large, say, tens of thousands. It may be difficult to cover them all, i.e. store all the relevant data, process and update it on-line; 3) The number of vehicles can also be very large, say, tens of thousands, so processing and updating in real time signals sent by them at time intervals of, say, a minute might be challenging for a server of average capacity; 4) An important point in his solution is evaluating vehicle speeds and averaging them over a block. This seemingly innocuous operation may highly problematic, however, within a traffic jam as many if not all speed measurements may return zero values. In other words, speed as a function of time may be wildly discontinuous and measuring it on time grid of a minute may prove highly inaccurate. Consider a case of growing jam. Average speeds will in this case give no indication of this dynamic change, the same being true of a dissipating jam. Averaging is a static operation incapable of catching a trend. Average speed is compared with a fixed constant while it might be better to compare it to "usual" speed empirically determined previously and stored in the database.

BRIEF DESCRIPTION OF THE INVENTION

This invention provides real time traffic Guidance System, which is capable of providing optimal route from the present position of a vehicle to a desired target destination when traffic jams may be present, thereby reducing the burden upon the driver when the vehicle is traveling at high speeds on unfamiliar roads. Thereafter the optimal route found is communicated to the driver and displayed on the vehicle's computer screen featuring the digital map of the relevant region and/or via audio instructions.

The travel time between two road intersections A and B is the sum of travel times for all sections of roads connecting A and B on the shortest route either by the minimal time criterion, or by some other criterion. Then in order to be able to compute a travel time between two positions on a map, we must be able to determine travel times for all sections of roads connecting those positions, or road intersections close to them. In the standard solution (an autonomous or stand-alone on-vehicle application), a route is computed by a mathematical optimization algorithm while travel times are computed as distances divided by maximal allowed speeds. While being simple, such solutions have an obvious shortcoming in that they do not take into account the real conditions on the roads and therefore can serve only as a guidance suggestion. Obviously, a true real time system should collect, store and make use of the following kinds of data:

1) Temporary changes in road conditions known in advance like closed roads under construction, traffic reroutes, etc.;
2) Regular predictable changes like everyday slowdowns in rush hours;
3) Sudden unpredictable changes such traffic accidents, traffic congestion due to sudden and drastic changes in traffic arrangements because of visiting dignitaries, etc.

The system in the present invention is built around an idea of collecting and processing information that describes all those changing conditions.

Overview of the Guidance System

The Guidance System in the present invention consists of CTU and a fleet of IMUs, i.e. traveling vehicles. In order to have an updated data on traffic situations, the vehicle fleet is divided into two categories: sample vehicles SMU and all other client vehicles CMU. In general, CMUs are only clients that "consume" traffic congestion data provided by the CTU. The sample vehicles, on the other hand can be both clients and serve also as antennas or tentacles for collecting real time data on traffic situations, which can be used by all end users for updating their optimal routes. This data collection is performed by permanent monitoring of GPS signals obtained from SMUs and by concurrent measuring of their current travel times along a broad range of roads.

FIG. 1 is a schematic representation of the information exchange between CTU and IMUs in the Guidance System. The data transfer from SMUs to CTU is done by wireless RF communication, and from CTU to both SMUs and CMUs by one-to-many multicasting system. The SMU vehicles communicate to CTU their GPS data: the present positions, the position time, their IDs, and their speed vectors at specific time intervals. After processing the information, CTU sends to CMUs updated information on traffic bottleneck situations (i.e. road ID, current time, and travel times of the latest n vehicles). At any given moment, the CTU also maintains the database containing travel times for all sections of roads at a particular time of the day, for a particular of day of the week, etc.

Initially, those travel times are theoretical travel times but as the time goes by and observational data are being collected and processed, they are replaced by empirical travel times reflecting realistic travel conditions, and on particular occasions by current travel times, which reflect sudden and unpredictable changes in traffic conditions. Those travel times are being measured and periodically broadcasted by the CTU via satellite IP Multicasting broadcast to end-users where they are entered into the databases of the on-vehicle computers for future use.

On receiving a request from a driver for a shortest route to a particular destination, the end-user on-vehicle computer applies an optimization procedure for computing an optimal route while making use of updated by CTU travel times for individual sections of roads. Thereafter, the optimal route is communicated to the driver either visually on the computer map, or auditorilly through a sequence of voice instructions. Below is the list of the major functions performed by the Guidance System.

Major Functions of the Guidance System

The CTU Functions
  1. Receiving GPS signals from sample vehicles.
  2. Processing those signals and storing the information in the central database.
  3. Managing (processing and storing) theoretical travel times.
  4. Managing (processing, storing and updating) regular (statistical) travel times.
  5. Managing (processing, storing and updating) current travel times.
  6. Maintaining and updating digital geographical maps of all roads.
  7. Managing zoning information.
  8. IP-Multicasting.
  9. Interaction with Administrator (human operator)
The IMU Functions
  1. The SMU Functions:
  2. Receiving and Processing GPS Data.
  3. RF Transmitting GPS Data to CTU.
The CMU Functions
  On-Line Information Processing:
  1. Receiving and Processing GPS Data.
  2. Maintaining Local On-Vehicle Database.
  3. Receiving and Processing IP-Multicast Updates.
  Processing Individual Navigation Requests:
  1. Receiving a Destination Point (and Optionally a Starting Point) from a Client.
  2. Translating Request into Standard Form.
  3. Processing Client's Request, i.e. Calculating the Shortest Route.
  4. Passing Solution to Display and Audio Unit.
  5. Processing Additional Individual User's Requests.

BRIEF DESCRIPTION OF THE DRAWINGS

FIG. 4 shows Information Exchange Between IMU and CTU;

FIG. 21 illustrates the Computation of Optimal Routes the algorithm A*;

DETAILED DESCRIPTION OF THE INVENTION

The major goal of the invention is to provide a real time travel Guidance System capable of handling a driver's request for a shortest route to any destination. At any point of the journey the driver can enter a request for alternative route and will receive an updated route reflecting the real time traffic situation directly on his display panel. The information will also be updated by visual and audio instructions, and driver's vehicle position will be displayed dynamically on the display unit. Another goal is to provide the driver with a tool for strategic trip planning. By entering alternate times for future trips and comparing their travel time estimates for the same destination, the driver receives an option to select a trip proposal ideally suited for his needs. The Guidance System also enables the user to manually, or by verbal commands, to update and customize his information database and adapt it to his personal needs and requirements.

Figure 1:
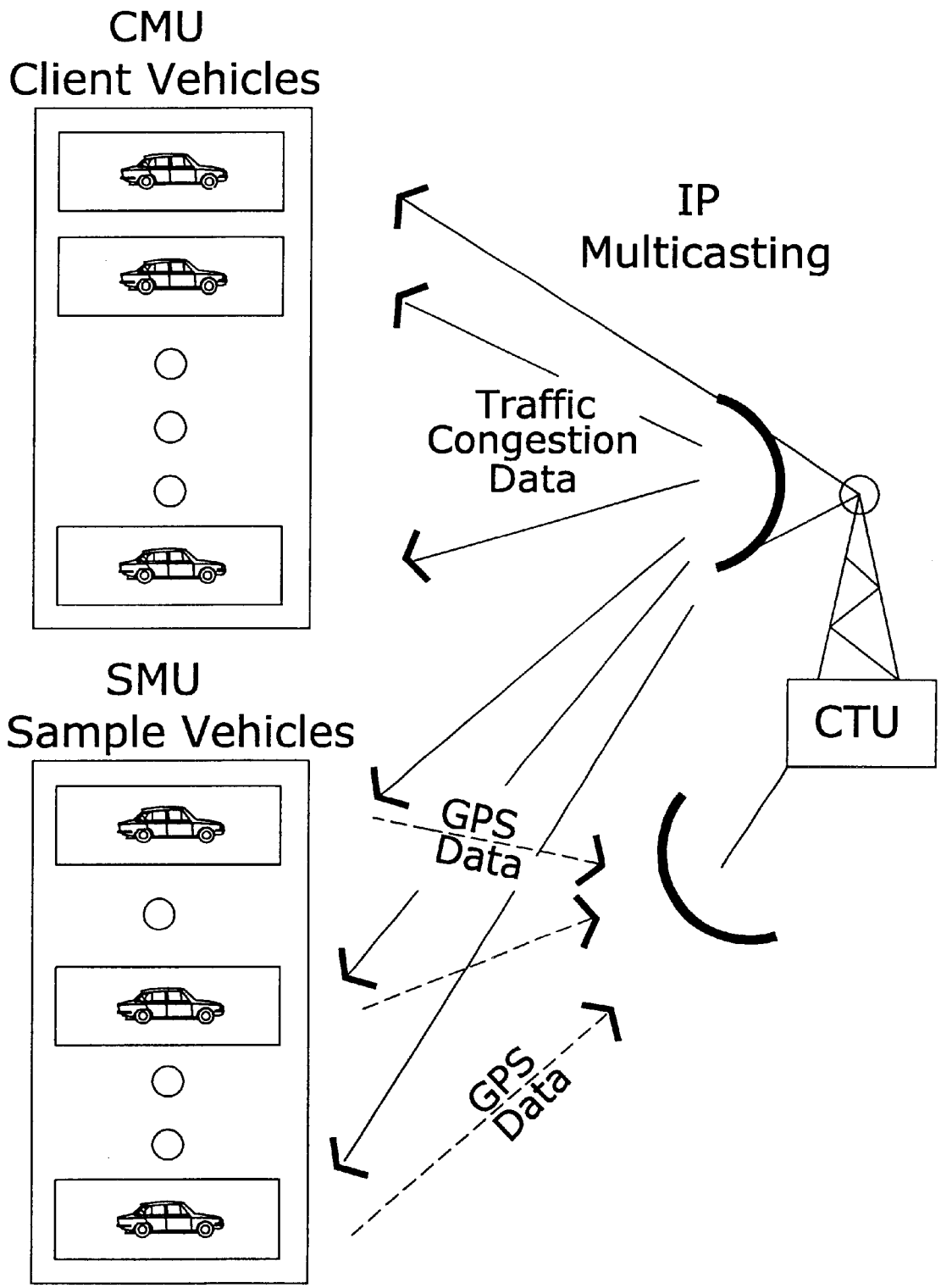
FIG. 1 shows Information Exchange in the Guidance System.

The subsequent description of the Guidance System is divided into the following parts:

1. Information Flow in the Guidance System
2. Algorithm for processing user's request
3. Vehicle's display and hardware
4. Sample vehicles and client vehicles
5. Two categories of roads
6. Information zones: updating on-vehicle databases via multicasting
7. Travel times data
8. General description of databases
9. Theoretical travel times
10. Regular empirical travel times
11. Current travel times
12. Computation of optimal route Information Flow in the Guidance System The Guidance System comprises client vehicles CMU, sample vehicles SMU, and the central traffic unit CTU (see FIG. 1). The CTU unit is configured to receive GPS data obtained from a fleet of sample vehicles SMU that are traveling and passively collecting sample traffic congestion data along a broad range of road systems. The CTU processes the information and passes it along to be multicasted to the groups of client vehicles CMU each according to its group position.

Figure 2:
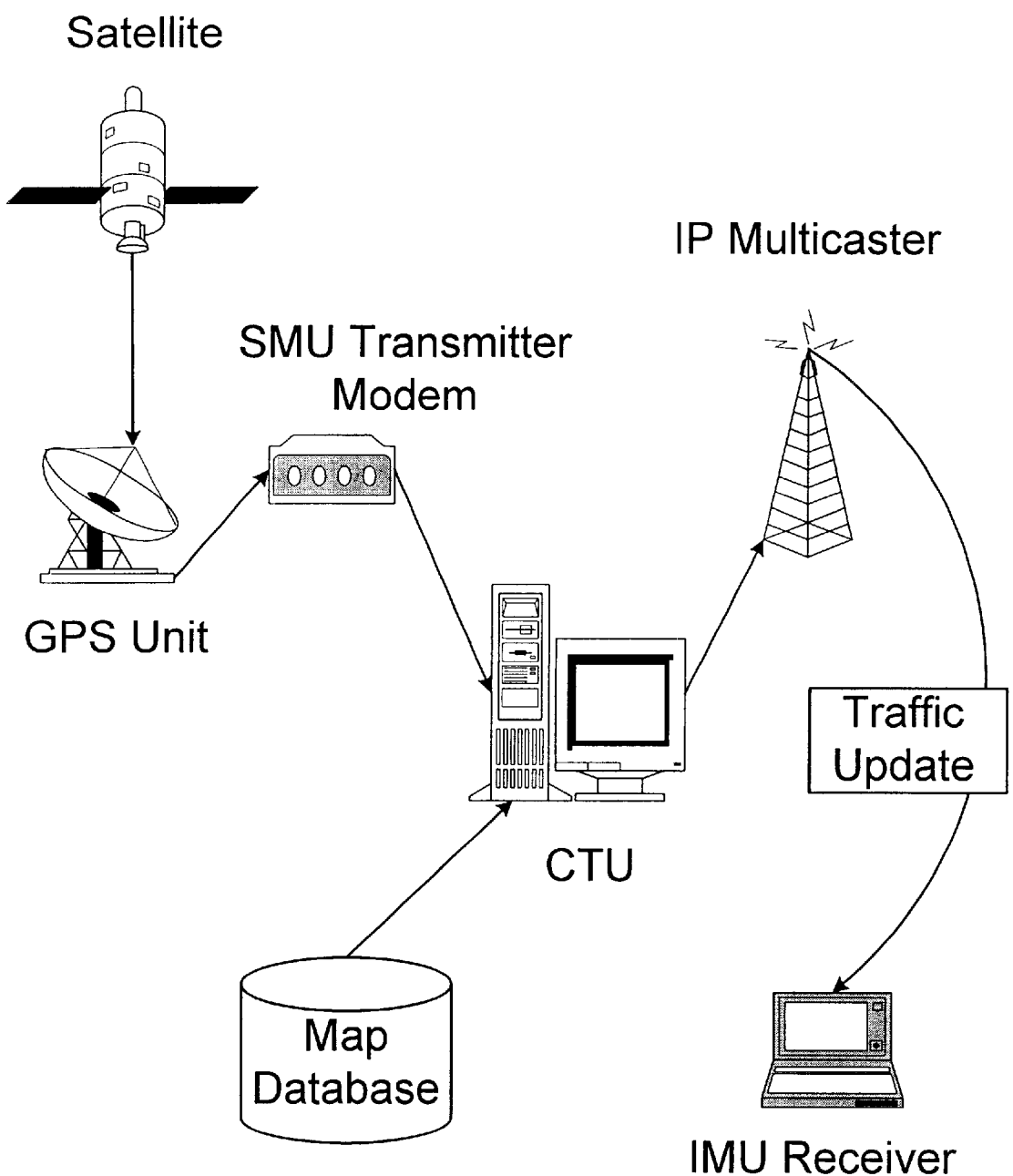
FIG. 2 shows Information Flow Between Individual Components of the Guidance System.

FIG. 2 shows information flow between individual components of the Guidance System. The GPS data obtained via satellite is transmitted by means of on-vehicle modem and transmitter to the CTU. CTU uses the map database and information obtained from all GPS units for calculation of real time information traffic updates that are thereafter IP-multicasted to IMU receivers and utilized for calculation of routes by on-vehicle computers.

Figure 3:
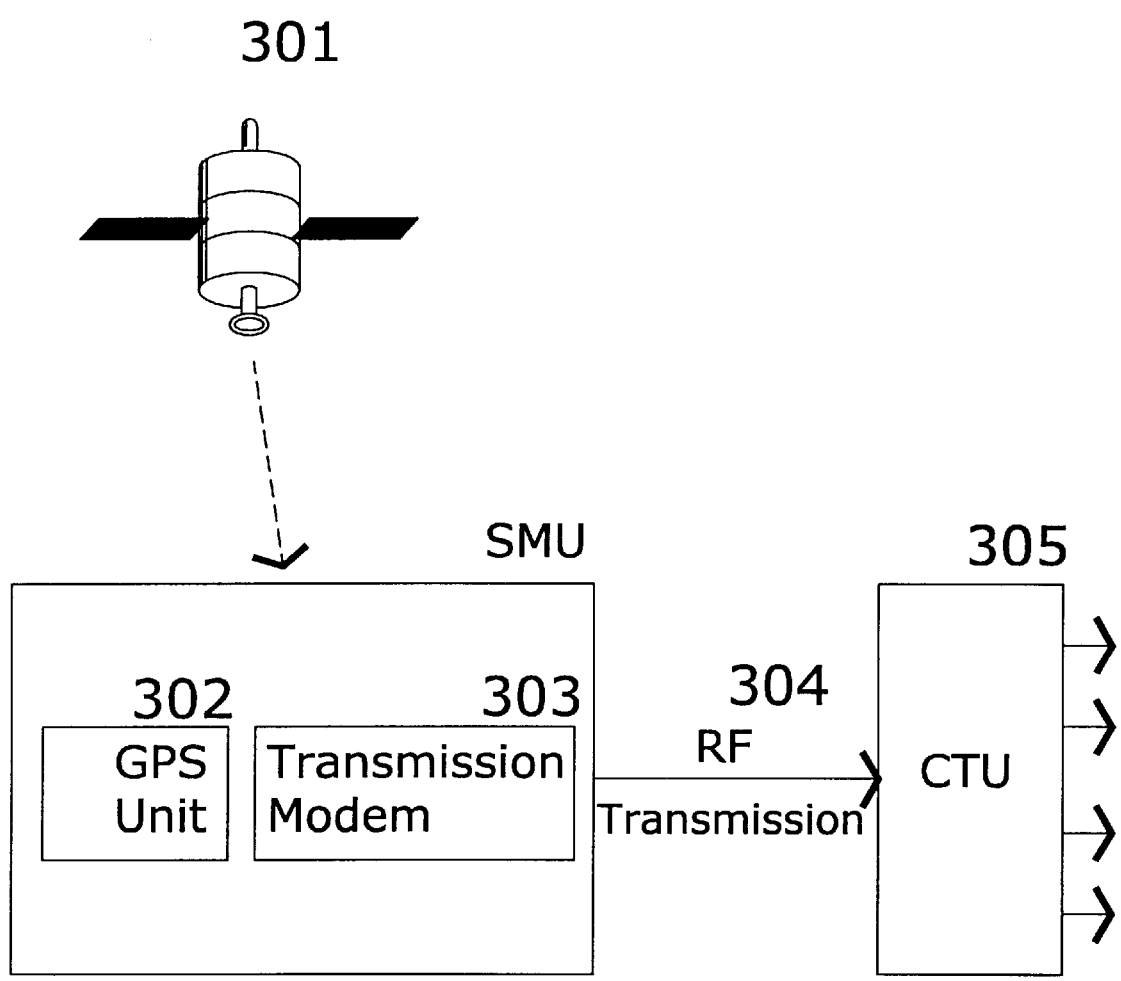
FIG. 3 shows Information Flow from SMU to CTU.

FIG. 3 shows information flow from SMU to CTU for a case when SMU is not a client, i.e. is not using the guidance services, and therefore is equipped only with GPS unit and Unit 1 shows the satellite supplying GPS signals to SMU. The only function of such SMUs in the Guidance System is providing GPS travel coordinates (Unit 2) along roads and transmitting them to CTU (Unit 5) by modem (Unit 3) RF transmitter (Unit 4). After the CTU processes the data and creates the real time traffic updates, it IP-multicasts them to all IMUs.

FIG. 4 shows the main components of the IMU and information exchange between IMUs and CTU. It illustrates two cases: when IMU is a client and when it is both a client and a sample vehicle. When IMU is a client only, consider Units 1 to 10. Unit 1 shows the satellite supplying GPS signals to IMU. The IMU navigation unit comprises Units 2 to 8. It consists of the GPS locator unit 2, processor (on-vehicle computer) 3 with its map database 6, display unit 4, an additional user manual input option 5, the map update database 7, and receiver 8. The IP Multicast 9 accomplishes the communication from CTU 10 to IMU. In the future embodiments, when client vehicles will be able to function as sample vehicles as well, they will be equipped with its own transmitter unit 11 for performing RF transmissions 12.

Figure 5A:
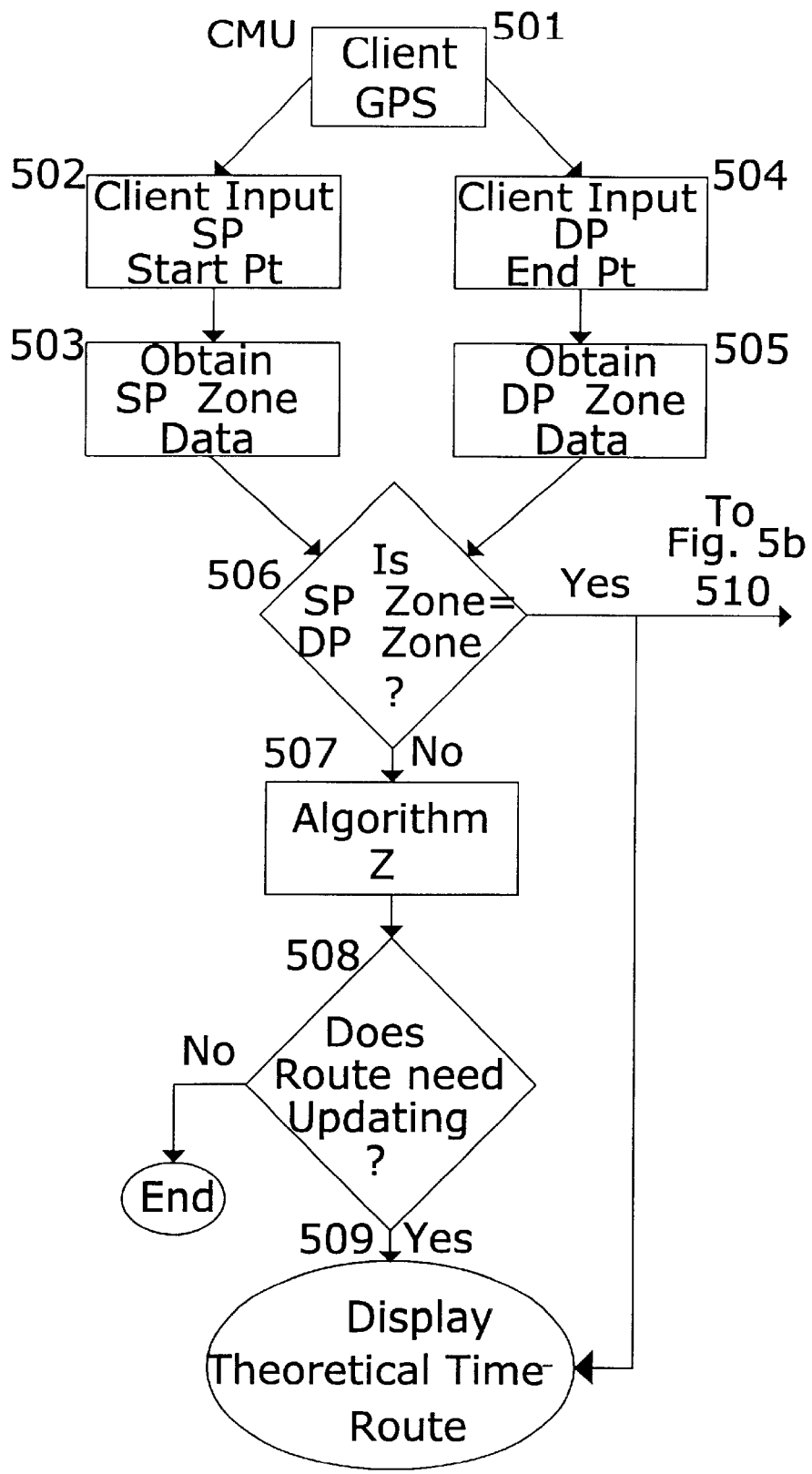
FIG. 5 shows the Flowchart of the Guidance System with Real Time Traffic Volume Updates.
Figure 5B:
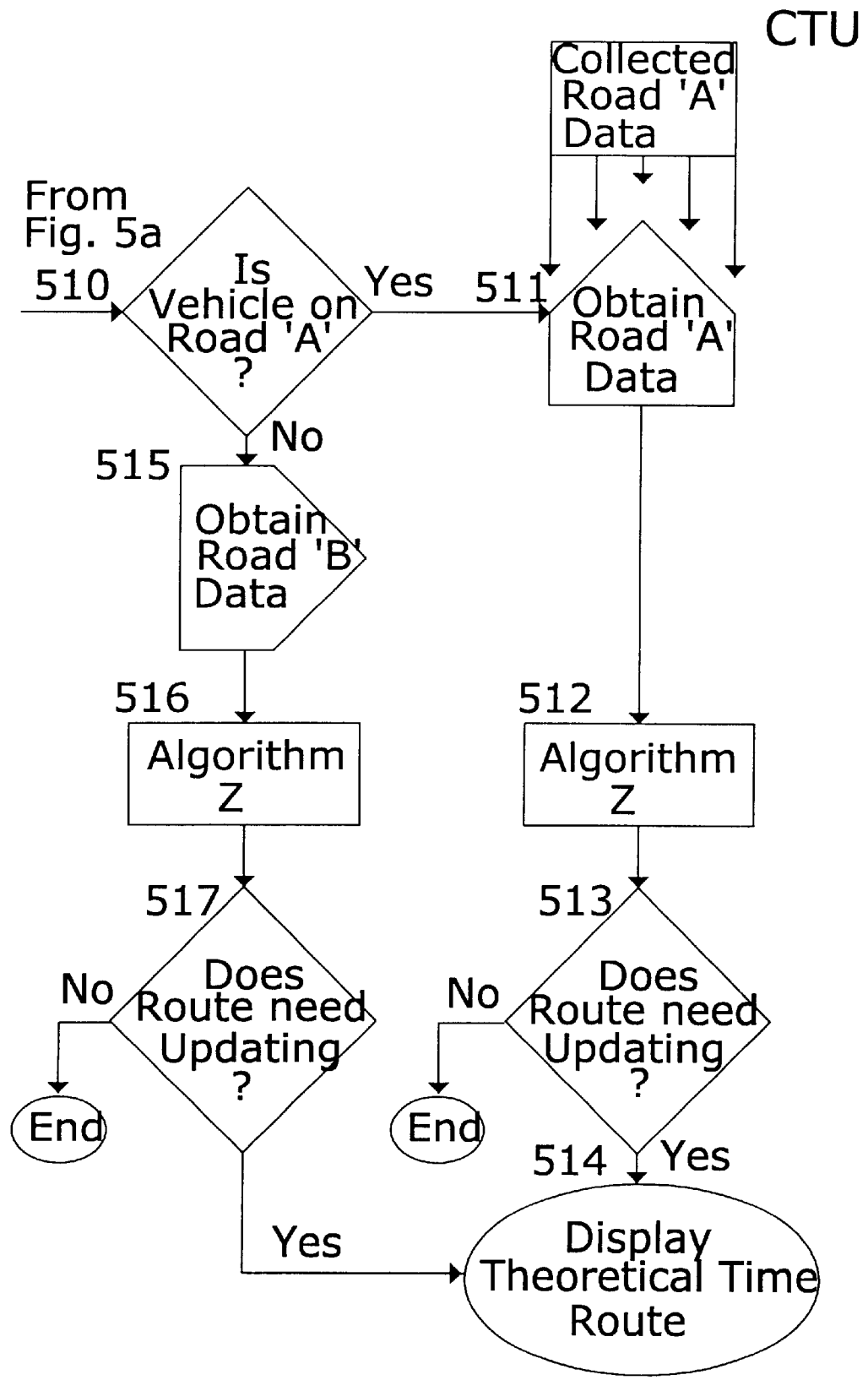

Major part of the Guidance System is illustrated by the flowchart in FIG. 5. The client is required to enter the desired starting point SP and the destination point DP (Units 2 and 4). In the on-vehicle application, SP may also be obtained automatically via GPS (Unit 1). For each SP and DP, specific zones are assigned with points SP and DP of sizes according to predetermined criteria and called SP zone and DP zone respectively (Units 3 and 5).

In order to determine if the current time information is available along the travel route, it is necessary to locate both SP zone and DP zone relative to the proposed travel route. If the two zones are not identical, i.e. the point DP is not located in the SP zone, it is assumed that only SP zone current time updates are be relevant to route calculations (Unit 6). Anymore real data at this point will only slow the calculation process. In Unit 7 algorithm Z is used to calculate the shortest travel route using theoretical travel times only. If the proposed route differs from the previously calculated stored route (Unit 8), it is displayed on the display as the theoretical travel time route (Unit 9). This is to emphasize the difference between the real time travel route and the default theoretical travel time route. The application now proceeds to produce shortest travel route in SP zone only. If the SP is located on a category A road (Unit 10), the most recent current travel times data collected by the SMU vehicles for the given SP zone 8 will be used in route recalculation step (Unit 11).

In Unit 12, algorithm Z is used to calculate the shortest travel route using current travel times. Again, the newly calculated route is compared to the stored version (Unit 13) and the updated route in SP zone is displayed as real time travel route. In the event, that the SP is not located on a category A road (Unit 10), it is updated on category B road table (Unit 15) as described in Regular Empirical Travel Times below. In Unit 16 algorithm Z is used to calculate the shortest travel route using category B road data. If the proposed route differs from the previously stored route (Unit 17), it is displayed on the display as real time travel route (Unit 14). It should be noted, that this displayed route would likely differ from the theoretical travel time route in (Unit 9) in that it will reflect the collected statistical data for the SP zone. Similarly, in Unit 6, if the SP zone is identical to the DP zone, i.e. the desired destination point DP is inside SP zone, the application will immediately proceed to Unit 10), etc. till display as real time travel route (Unit 14).

Algorithm for Processing User's Request

The Guidance System begins processing user's request for an optimal route (see FIG. 6, Unit 1) by looking at destination point DP received from the user, and by utilizing available data updates from CTU on the traffic situation in the specific zone (Unit 3). For the vehicle origin point SP, the application uses the default of the current vehicle position in Unit 6 as obtained by GPS in Unit 2 unless otherwise specified by the user (Units 4 and 5). In Unit 7, the route-planning algorithm calculates the optimal route while using multilevel map database (Unit 8), requesting travel times for various sections from the section travel time managing algorithm in Unit 9 (see details in FIG. 7), and using the returned section travel times for further processing. In Unit 10, the shortest route calculated in Unit 7 is transformed into a required form (signs to be shown on a map, or audio directions) and communicated to the display unit in Unit 11.

Vehicle's Display and Hardware

Figure 8:
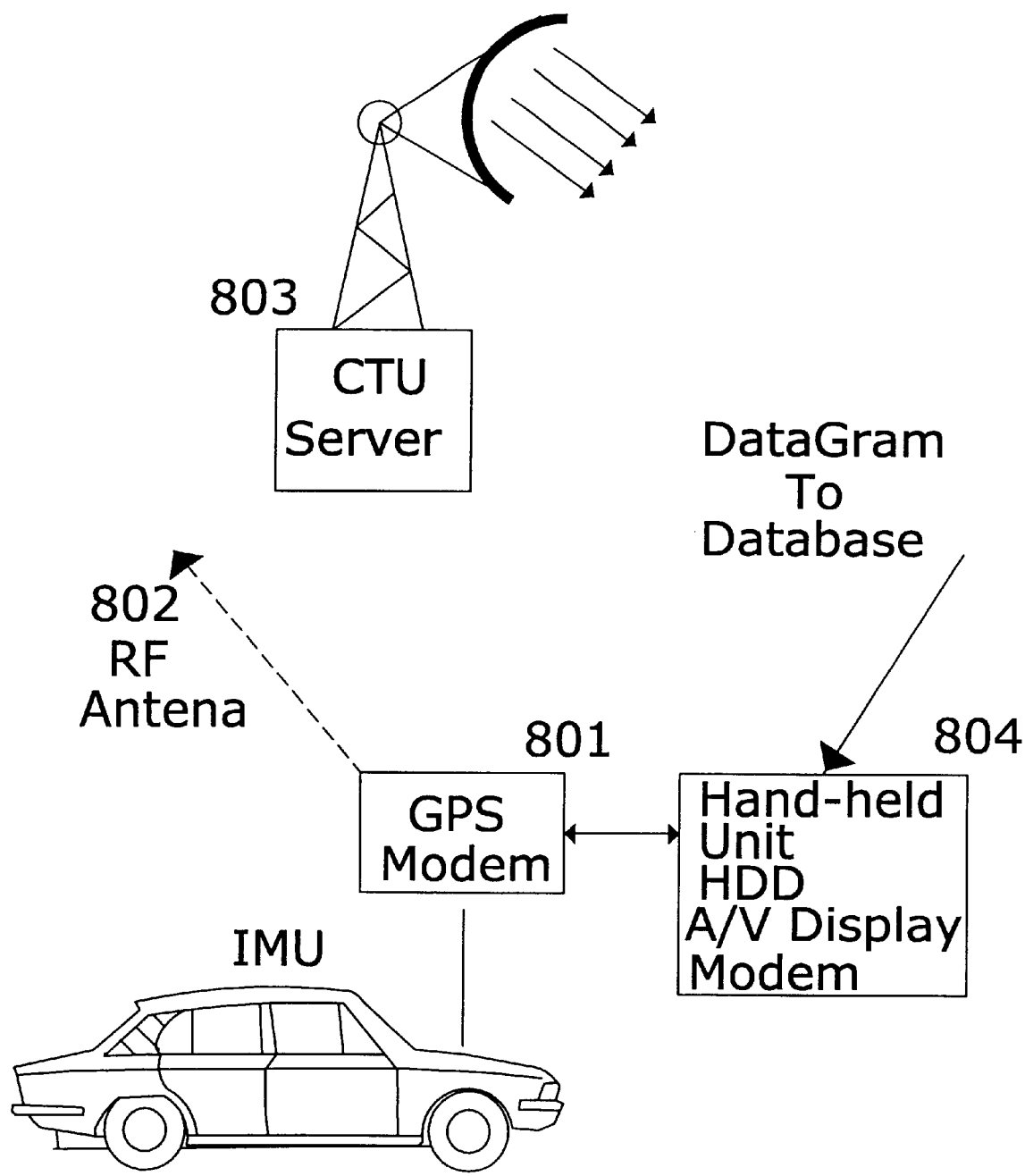
FIG. 8 shows Vehicle Hardware Configuration.

FIG. 8 illustrates the Hardware Configuration on IMU vehicle where GPS locator and a modem (Unit 1) are positioned on the vehicle. GPS information is then transmitted by modem RF antenna (Unit 2) to CTU (Unit 3). The updated data-grams are received by hand-held operating Unit 4 equipped with hard disk, local map database and modem. In the default state, the hand-held Unit 4 is attached to Unit 1, but it can be also detached and operated remotely to enable full flexibility of use. In this fashion, the hand-held Unit 4 can function fully as a stand-alone version.

Figure 9:
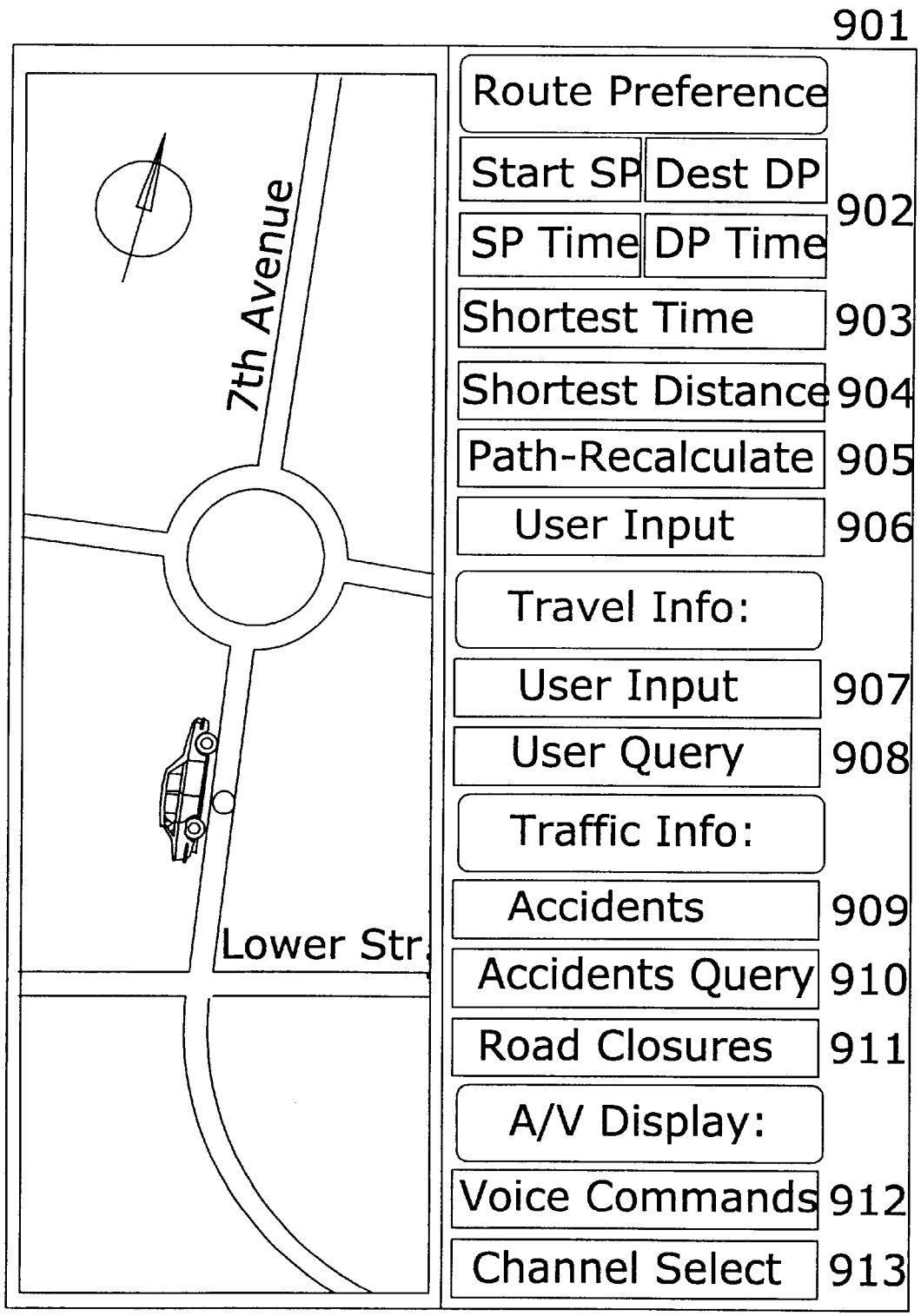
FIG. 9 shows Vehicle Display Panel.

Reference is made to FIG. 9 and the functions of CMU Display Panel Unit 1. In the preferred embodiment the display unit is color CRT or a touch screen color display device easily accessible to the driver. The travel maps are displayed on the screen and the present vehicle GPS location can be observed dynamically on the map. The driver enters the desired destination point DP 2 and may specify route preferences by selecting the shortest Travel Time (option 3) or shortest Travel Distance (option 4). The user may also enter DP and route requests via voice commands decoder in the audio controller Unit 12. The calculated route is then stored in the storage unit. When the update of the traffic information broadcast is received, the driver is notified by audio Unit 12 from the speaker, and simultaneously receives the updated path on the screen. If so desired, the driver can override the alternate path by specifying override preference (Unit 5). The CMU can also perform a check of present location prior to each sudden change of path and measure the distance to the next intersection in order that a safe change of path can be executed (Unit 8). In addition, the driver may select both audio and visual summary of all traffic situations and slowdowns (Unit 9) in the particular zone he is traveling in, all in real time. He will be able to record any unusual or sudden traffic problems locally on CMU input Unit 7 and in addition may enter any items of interest connected to his travel route in the user Unit 8 and accessed by simple query.

Sample Vehicles and Client Vehicles

As indicated in the brief description, in the present invention the vehicle fleet is divided into sample vehicles, or SMU, and end users, or CMU. The CMUs only "consume" traffic congestion data, while the SMU also collect real time data on traffic situations, that will later be used by all end-users for updating their routes. One reason for specifying only SMUs for collecting current data is that the data will be processed in real time and may quickly overwhelm the server capabilities. Since the number of SMUs is a parameter that one can set at will by the Administrator, the volume of relevant calculations can be kept under control. It should be noted that in the future embodiments, under appropriate circumstances, distinction between CMUs and SMUs might be eliminated, and all vehicles could be used as sample vehicles.

A remark on terminology may be in order. Our term 'sample vehicles' borrowed from statistics does not mean that the vehicles are picked at random, but only that they do not travel on a predetermined path. Sample vehicles may include taxis, police cars or any other vehicles equipped with reporting devices. Randomness enters here only as the subset of roads they "chose" to travel at a given moment. While the order at which the traveling times on these roads are updated may be at random as a whole the real time information on regional traffic situation may be made statistically accurate.

Two Categories of Roads

It appears practically impossible to collect, store and update information on all sections of roads even in a moderately large area where the numbers may run into hundreds of thousands or even millions, so the present invention proposes a division of all roads in a given geographical area into two basic road categories: A and B. Category A consists of all main roads according to the following criteria:

1) Roads that connect important geographical or administrative locations;
2) Roads that carry large volumes of traffic;
3) Roads that are long enough to enable real time monitoring through SMUs.

Category B contains all roads not in category A.

When a vehicle is traveling along a road in category A, its transmitting device is supposed to communicate its GPS coordinates enough times to allow for accurate estimation of the travel time for this specific road. It is expected that doing real time traffic monitoring on the roads in category A alone will help to keep the volume of relevant calculations under control.

It should be noted that the division of roads into categories A and B might not exactly correspond to the conventional classification into types such as interstate highways, state highways, etc. It is only being done for the use in data processing and constitutes an important part of preliminary database tuning.

A straightforward method to make this division may be based on conventional road types. For example, interstate highways, state highways, national roads and some major streets might be grouped into category A, with the remaining ones into the category B.

Figure 10:
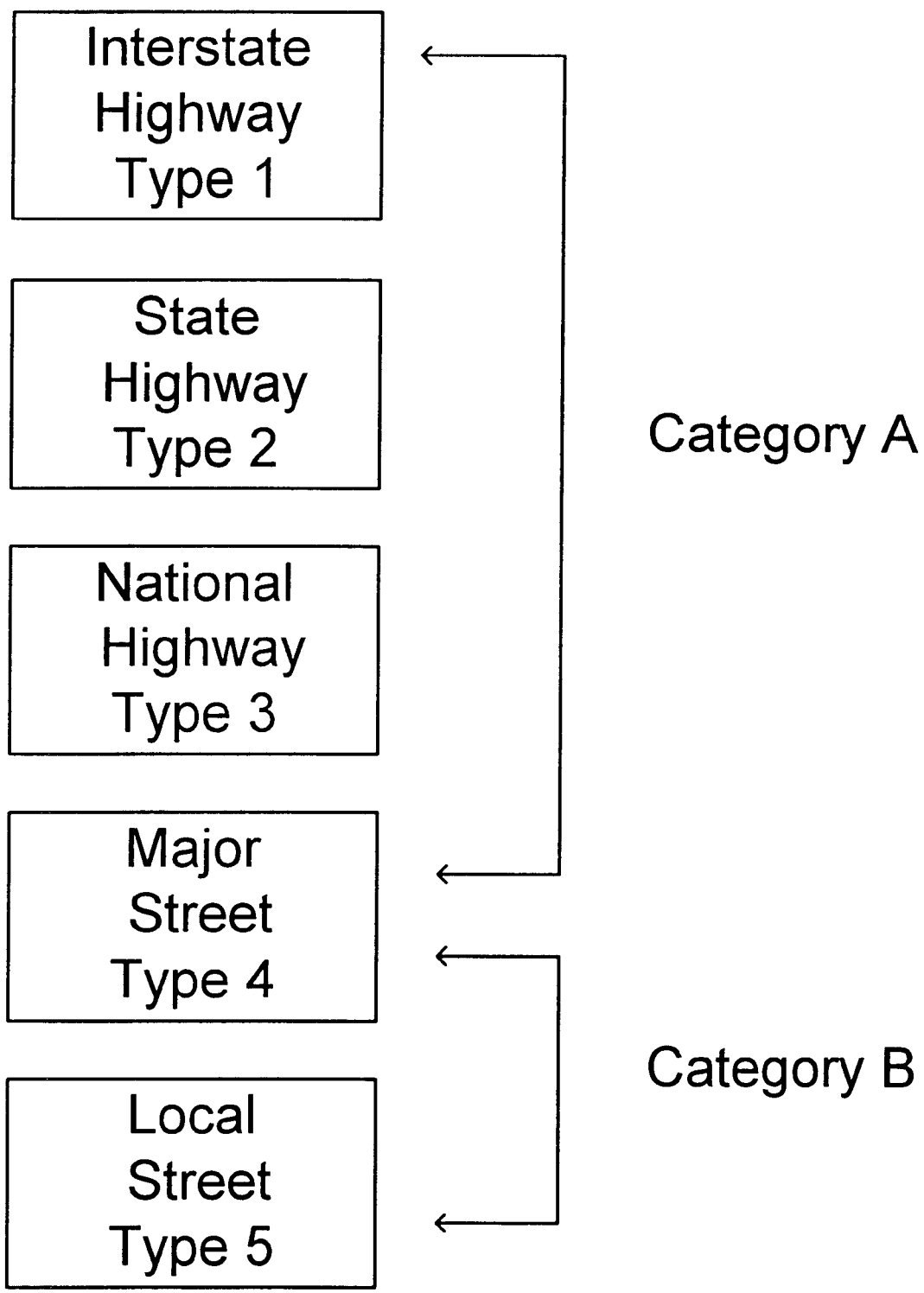
FIG. 10 is the Road Type Classification.
Figure 11A:
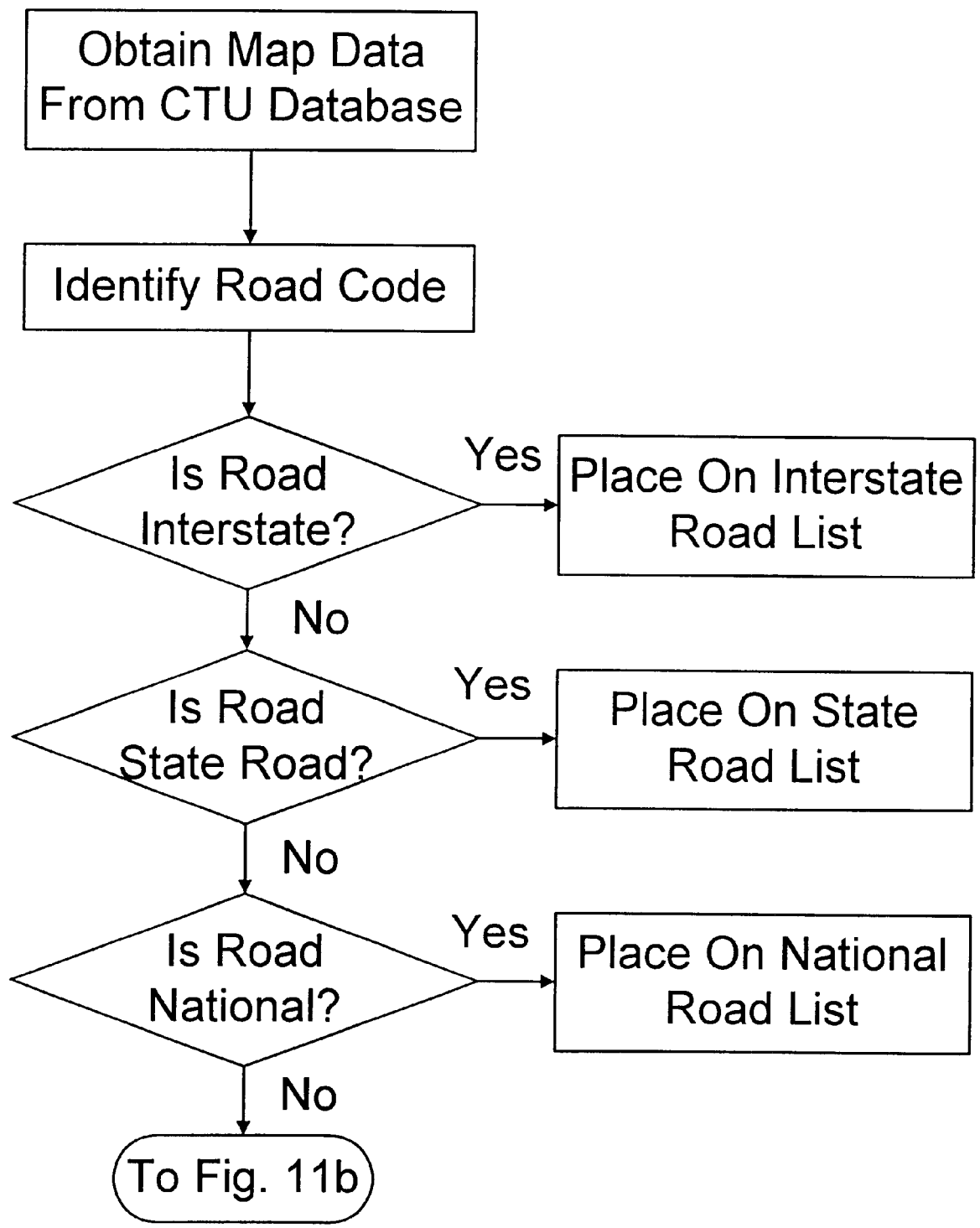
FIG. 11 is Road Classification Flowchart.
Figure 11B:
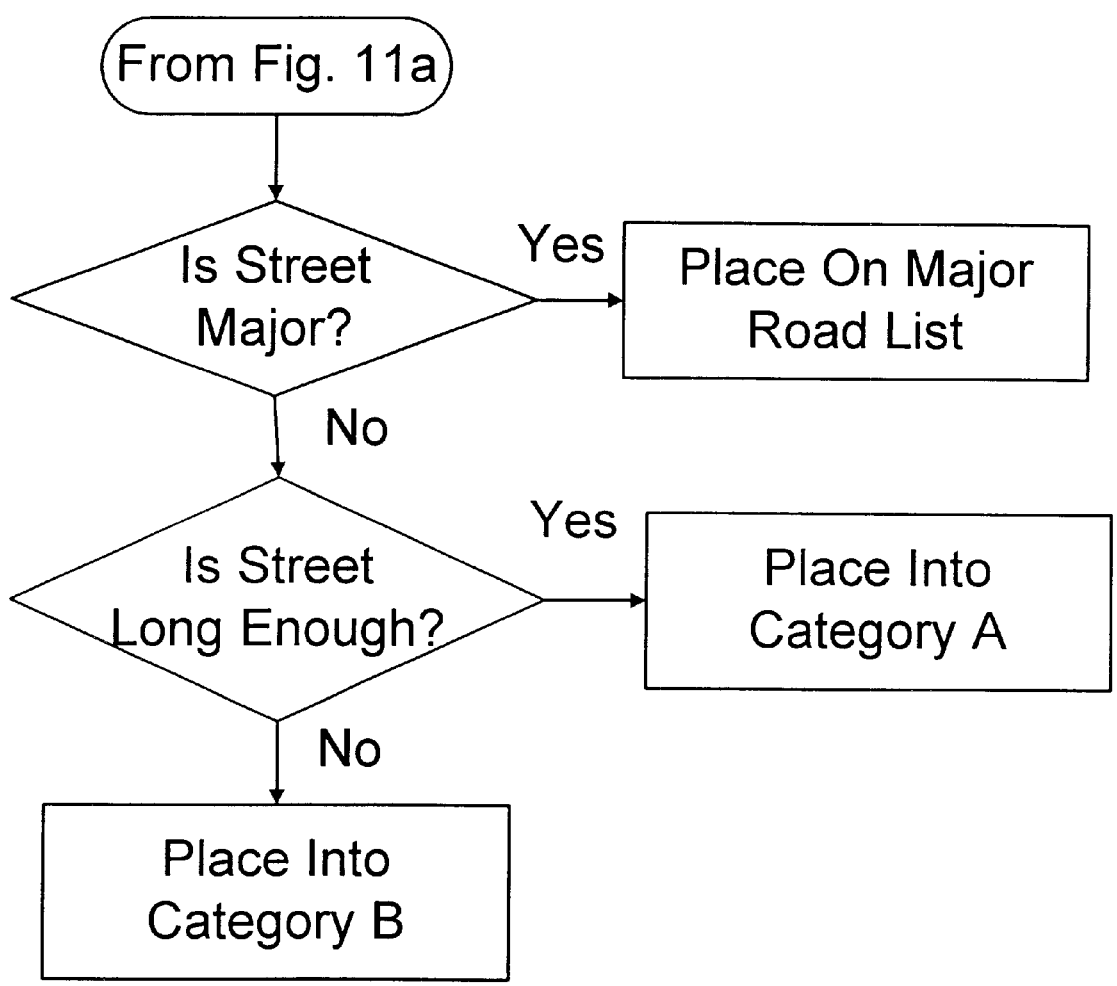

FIG. 10 shows a flowchart of Road Type Classification based on a conventional road map. Each road is identified according to its type and code such as Interstate, State, National etc. codes, and is as processed according the above-mentioned criteria. Accordingly, each road is grouped into category A or category B as appropriate. An algorithm for doing this is shown in FIG. 11. In this manner a list of all A roads is created before the traffic volume coefficients in category A roads can be assigned. It should be noted that many roads may be further subdivided into smaller road sections and recorded separately with their individual origin point and endpoint coordinates, as well as the section ID, name, length, etc.

A more sophisticated division could be done by a more complex classification algorithm that performs classification based on type, maximum allowed speed, road length, road width, average traffic volume, registered average traffic volume (if available). Such an algorithm will have an obvious advantage of being able to perform automatic classification. Its apparent disadvantage is that it may still not satisfy some of the criteria outlined above. Besides, experience gained in utilizing the Guidance System for some time may show desirability of including additional roads into category A, or moving others into category B. As an example, consider an average traffic volume which is an important factor in classifying a road into category A or B. This factor may be unavailable at the beginning of the Guidance System functioning, and moreover, it may be changing over time. However, after the Guidance System has been operative for a period of time, and enough statistical data on traffic loads has been collected, we can introduce corrections into original subdivision of roads into categories A and B. Therefore, it appears unwarranted to try to rely solely on automatic classification, and a possibility of human intervention should be provided for at all stages of the Guidance System functioning.

Information Zones: Updating On-Vehicle Databases Via Multicasting

In the present Embodiment, all the databases in the sample vehicles and user vehicles are updated from CTU on a regular basis. These updates are done for both statistical (empirical) travel times and current travel times.

It appears, however, that such updating made on a global scale may not be practical as, quantities of data on traffic loads associated with all roads in category A and statistical data associated with roads in category B may be simply too vast to be multicasted and stored in on-vehicle databases. On the other hand, the updates in such volumes are clearly not necessary. Consider a simple example.

A driver presently situated in Jerusalem requests a route through Haifa. Obviously, present traffic jams in Jerusalem may be relevant while planning a route while those existing presently in Haifa are not since the traffic situation in Haifa is subject to change by the time the driver arrives there. On the other hand, by the time the driver arrives in the neighborhoods of Haifa, the traffic jams there if any may become relevant for recalculating of the route. Therefore, it seems logical while planning a route to use different travel times in different locations, in particular, to use current travel times in the vicinity of the present position of a vehicle, and at the same time to use statistical travel times elsewhere. For these purposes, the present invention utilizes IP multicasting technology as described i.e. in the monograph by B. Williamson, Developing IP Multicast Networks, vol. 1, Cisco Press, 2000 (see especially pp. 17–18), in the following way.

Figure 12:
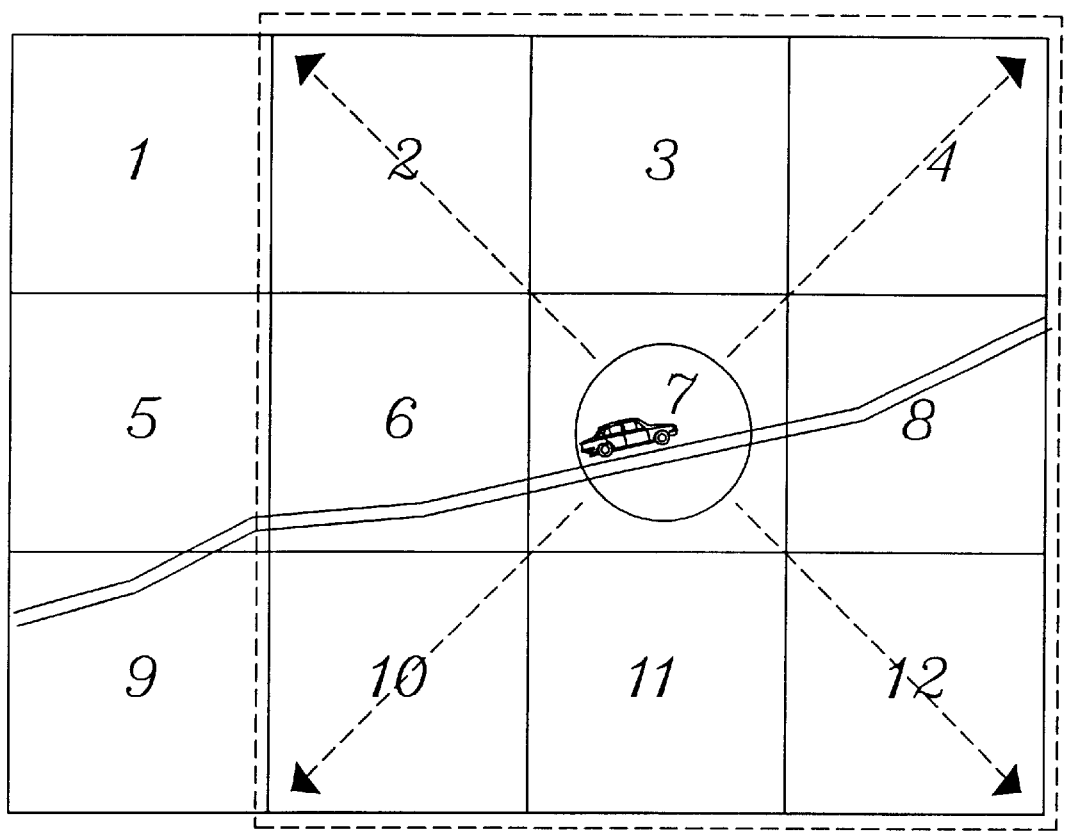
FIG. 12 is IP-Multicasting to Vehicles Traveling from Zone to Zone.

A large geographic area may be subdivided into a set number of subregions, a simple division consisting of squares in a regular grid. The size and division of the grid is predetermined by a number of criteria such as road density and average volume of traffic. A zone may be defined as a group of squares put together for a particular task. In particular, a zone of nine contiguous squares is called a neighborhood of its central square. For example, in FIG. 12, the zone (1,2,3,5,6,7,9,10,11) is identified as the neighborhood of the square 6. When a vehicle enters a square, say, square 6, its IMU database receives the updated information required for optimal navigation in that particular square and in its neighborhood (1,2,3,5,6,7,9,10,11). This information is specific traffic load data pertaining to that neighborhood. It is chunked accordingly and multicasted to all vehicles situated inside of that square at preset time intervals, say, each 15 minutes. If the updated data is different from the previously stored data, then the on-vehicle database will automatically replace the old data and recalculate an alternate route. If so desired, the driver will be given an option to continue on the previous route (see display in FIG. 9). As a vehicle moves from square 6 to square 7, say, it receives the updated real time data directed to square 7 and related to traffic load within its new neighborhood (2,3,4,6,7,8,10,11, 12).

The IMW databases also contain geographical digital maps and all pertinent zone information. However, in order to enable an efficient and speedy information transfer, updating of the relevant traffic jam information is done only on the local zone basis. In the present Embodiment, all the IMU databases are updated via satellite IP-Multicasting broadcast, or via other conventional wireless solutions like cellular modem.

Travel Times Data

Travel speeds along roads of various types (see FIG. 10) can be obtained from the maximum allowed travel speed and by multiplying it by corresponding speed coefficients, so that traveling along any particular road is assumed to be done with a speed pertinent to the type of that road. The resulting speeds will be called the theoretical speeds, see below, and the corresponding coefficients will be stored in a database in advance and provided on request. However, theoretical speeds are relevant only to ideal cases and will be probably never utilized except between midnight and early hours in the morning and even then under particularly favorably conditions. There are many reasons for this such as traffic congestion in rush hours, less than perfect road conditions, unfavorable whether conditions, falling trees, public gatherings, demonstrations, and probably a host of other factors that are difficult to enumerate.

The factors may be conveniently classified into three categories:

1. More or less stable changes in road conditions known in advance like closed roads under construction, traffic reroutes, changes in traffic arrangements because of visiting dignitaries, etc.;
2. Regular predictable changes like everyday slowdowns in rush hours;
3. Sudden unpredictable changes such traffic accidents, traffic congestion due to sudden and drastic changes in whether conditions, etc.

Factors in the first category may be usually dealt with by intervention of the human operator who can enter opening times and their duration manually in advance, and can provide for appropriate corrections into the database.

Figure 6:
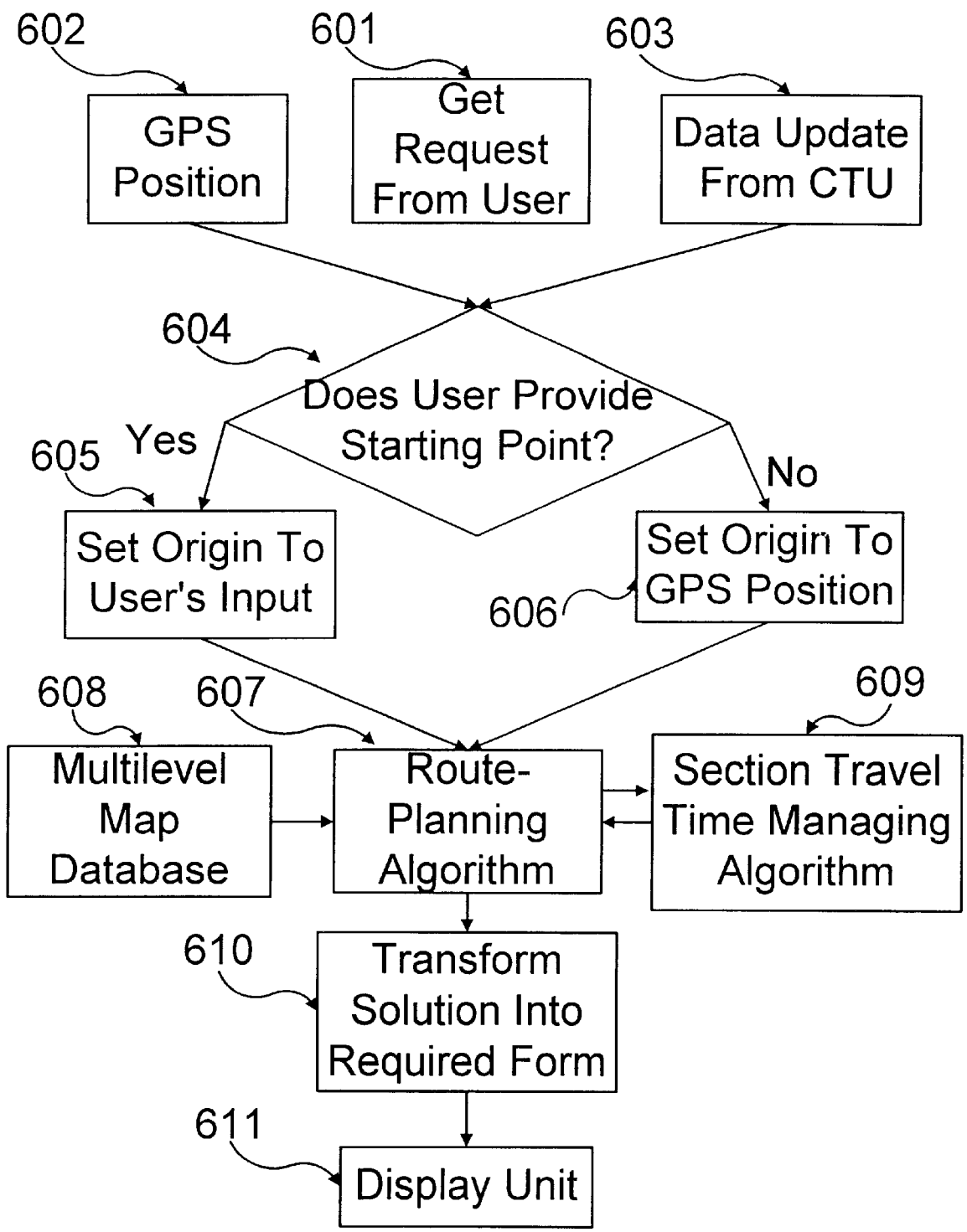
FIG. 6 shows the Algorithm for Processing User's Request.
Figure 7:
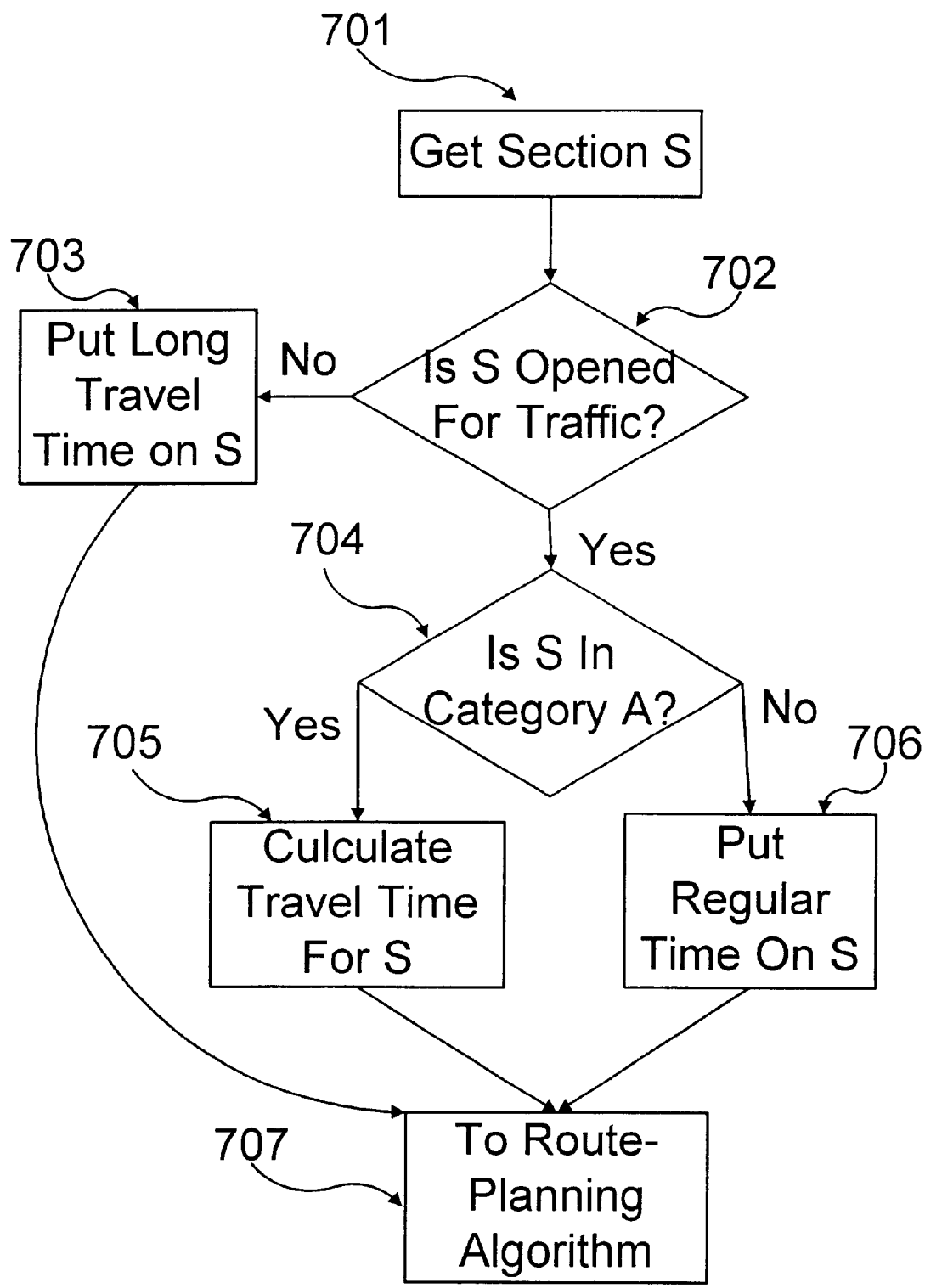
FIG. 7 shows the Section Travel Time Managing Algorithm.

FIG. 7 shows the Section Travel Time Managing Algorithm from Unit 9 in FIG. 6. Unit 1: A section of the road for processing is received from Route-Planning Algorithm (Unit 7 in FIG. 6). Unit 2: If the section is opened for traffic, go to Unit 4, otherwise in Unit 3 a long travel time is put on it to make it unlikely to be selected for traveling by the route-planning algorithm. Unit 4: If the section is in category A, calculate travel time for it in Unit 5 (see FIG. 13 for details), otherwise use a regular travel time extracted from the database (Unit 6).

Factors in the second category can probably be better accounted for by using statistical tools, i.e. by collecting statistics on travel times along particular roads or particular types of roads, at particular hours, at particular days of the week, etc. Being averages by necessity, those statistical or empirical travel times will nevertheless be much better approximations to reality than theoretical times often used in similar navigation systems. As the time passes by and enough statistics have been collected, the theoretical times are replaced by the corresponding empirical, i.e. statistical travel times based on which the corresponding empirical speed coefficients may be calculated and used instead of the theoretical speed coefficients (see calculation of empirical travel times in the section Regular Empirical Travel Times below).

As to factors in the third category, it appears that even empirical travel times may be unsuitable for describing traffic conditions arising from sudden and unexpected circumstances which might drastically influence traffic conditions, so that the present Guidance System takes care of such eventualities by creating and updating special data structures associated with all roads in category A. Any slowdowns on those roads reflected in excessive travel times of sample vehicles are identified and stored in the database for a limited period of time and may be utilized by end-user computers if and when relevant (see FIG. 13 and the accompanying description in the section Current Travel Times.). This last feature provides the present invention with truly real time capabilities.

General Description of Databases

Major functions performed by the CTU have been listed in the Brief Description of the Invention.

Figure 14B:
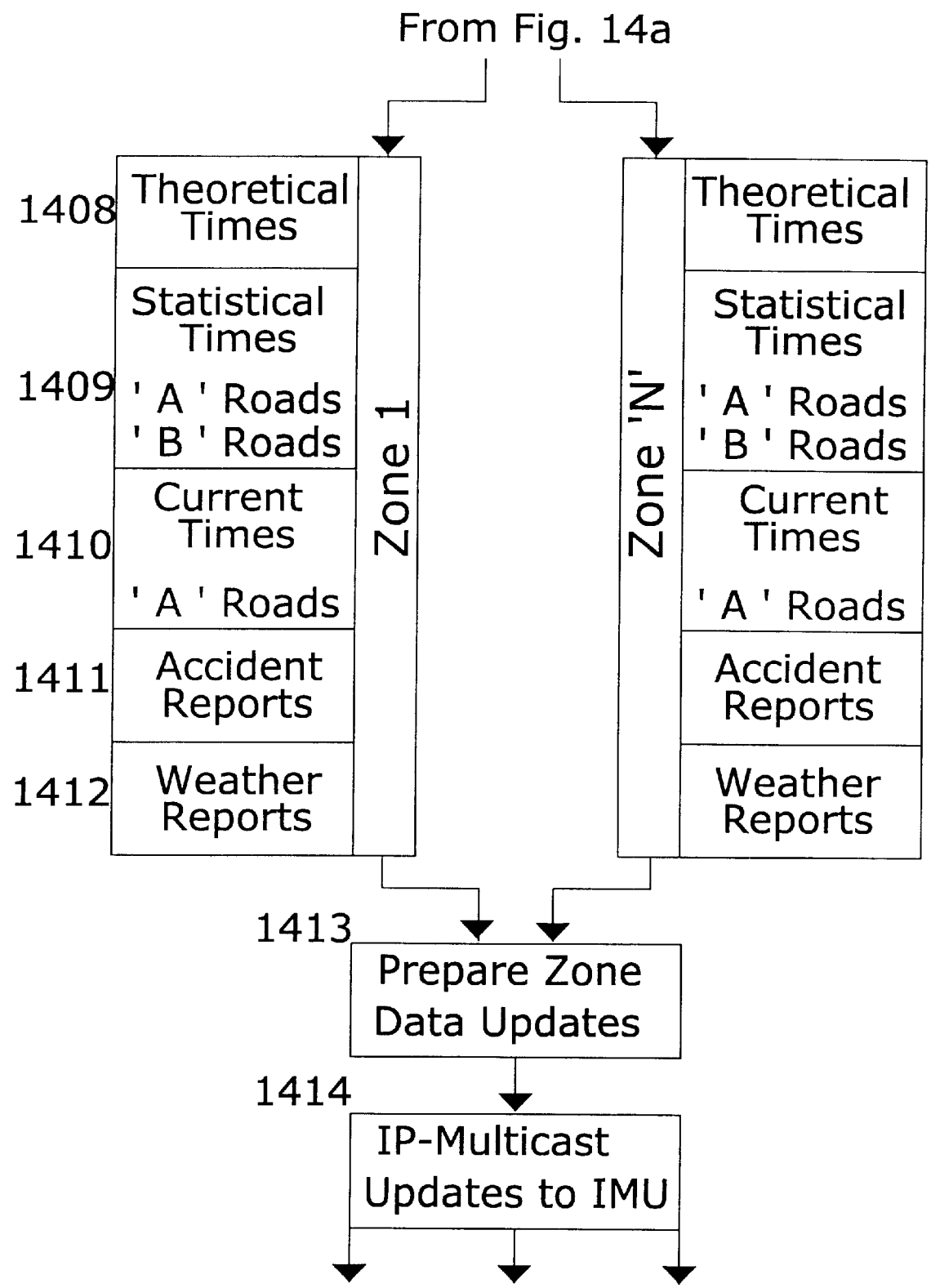
FIG. 14 shows the CTU Database.

FIG. 14 shows structured diagram of the CTU database and the corresponding information and control flows. The GPS signals received from sample vehicles (Unit 1) are utilized for processing statistical database times (Unit 2) and current travel times (Unit 3). An important function of the CTU database is maintaining and updating geographical maps of all major and minor roads divided according to geographical zones (Units 5 and 6). The CTU database also stores all the data relevant to particular zones such as coordinates of their squares on the grid (Unit 4). In Unit 5 the travel time data is combined with geographical data, grouped according to geographical zones (numbered from 1 to N), and stored for future use. Intervention of human Administrator is possible at this stage (Unit 7). All information relevant to the roads such as distances, allowable speeds, traffic lights, traffic intersections, traffic directions, etc. is also grouped according to geographical zones and stored in the CTU database. Everything associated with each particular zone is stored in the CTU database as one structure (Units 8–12): theoretical travel times, regular (statistical) travel times, the updated traffic data associated with category A roads and all necessary data for computation of current travel times, accident and weather reports. After zone traffic data updates have been prepared (Unit 13), they are multicasted to IMUs (Unit 14).

The individual IMU databases also contain geographical digital maps and all pertinent zone information. However, in order to enable an efficient and speedy information transfer, updating of the relevant traffic jam information is done only on the local zone basis. Since on-vehicle navigation systems use complex mathematical algorithms for route planning, it is important that they receive only those data, which are necessary for obtaining optimal solutions.

When a vehicle enters a geographical zone, its IMU database receives all the information multicasted periodically by chunks to end-users traveling in that particular zone. As the vehicle moves from one zone to another, the chunks of information that the on-vehicle database is receiving are changed accordingly.

As said above, the present Guidance System uses for route planning empirical statistical travel times instead of theoretical travel times. These empirical travel times are preserved in the form of empirical speed coefficients by which the maximum allowed speeds should be multiplied. Accordingly, another major part of the system database consists of a multidimensional table of speed coefficients (see FIG. 15 and FIG. 16 and more details in the section Regular Empirical Travel Times below).

The present Guidance System can also account for rapid unpredictable changes in road conditions by maintaining special data structures associated with all category A sections that make it possible to store on-line information on such changes and use them for predicting future traffic conditions within a short time range. The key elements of those data structures—ordered lists of travel times of the vehicles that have recently left the corresponding sections—are periodically multicasted to IMU databases for calculations of optimal routes (see more details in the section Current Travel Times below).

Theoretical Travel Times

At the initial period, the CTU provides for clients requesting travel time between their present position and their desired destination the theoretical travel times. Those Theoretical Travel Times (TTT) are valid only under ideal conditions and can be calculated by the formula $$TTT=L/V$$

where L is the length of the section S, and V is the maximal speed allowed on section S. Of course, for different types of roads the maximum speeds are different. Whenever possible, these theoretical travel times will be replaced by estimated empirical travel times as described below.

Regular Empirical Travel Times

Figure 15:
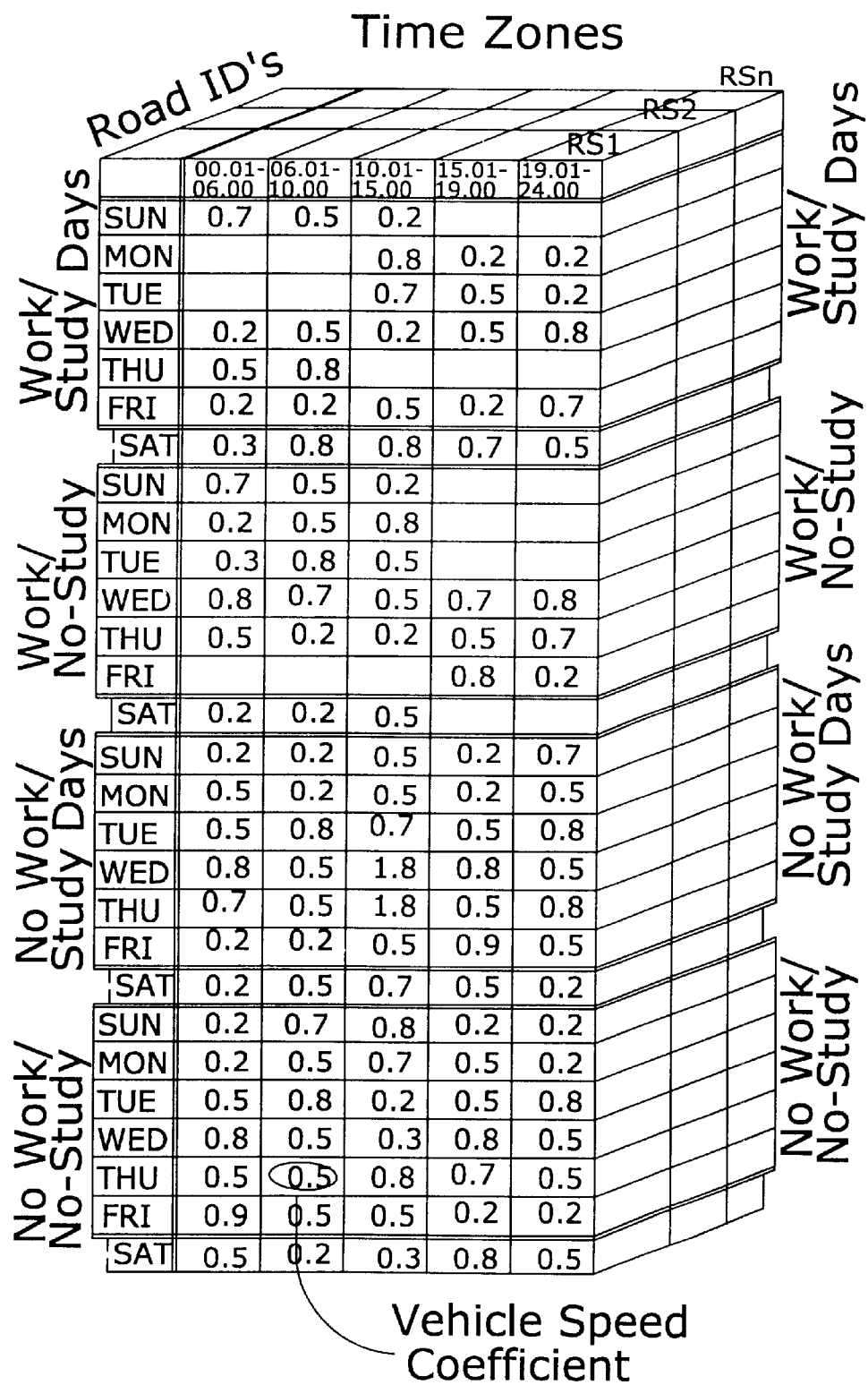
FIG. 15 is Table of Administrator for Category A Roads.
Figure 16:
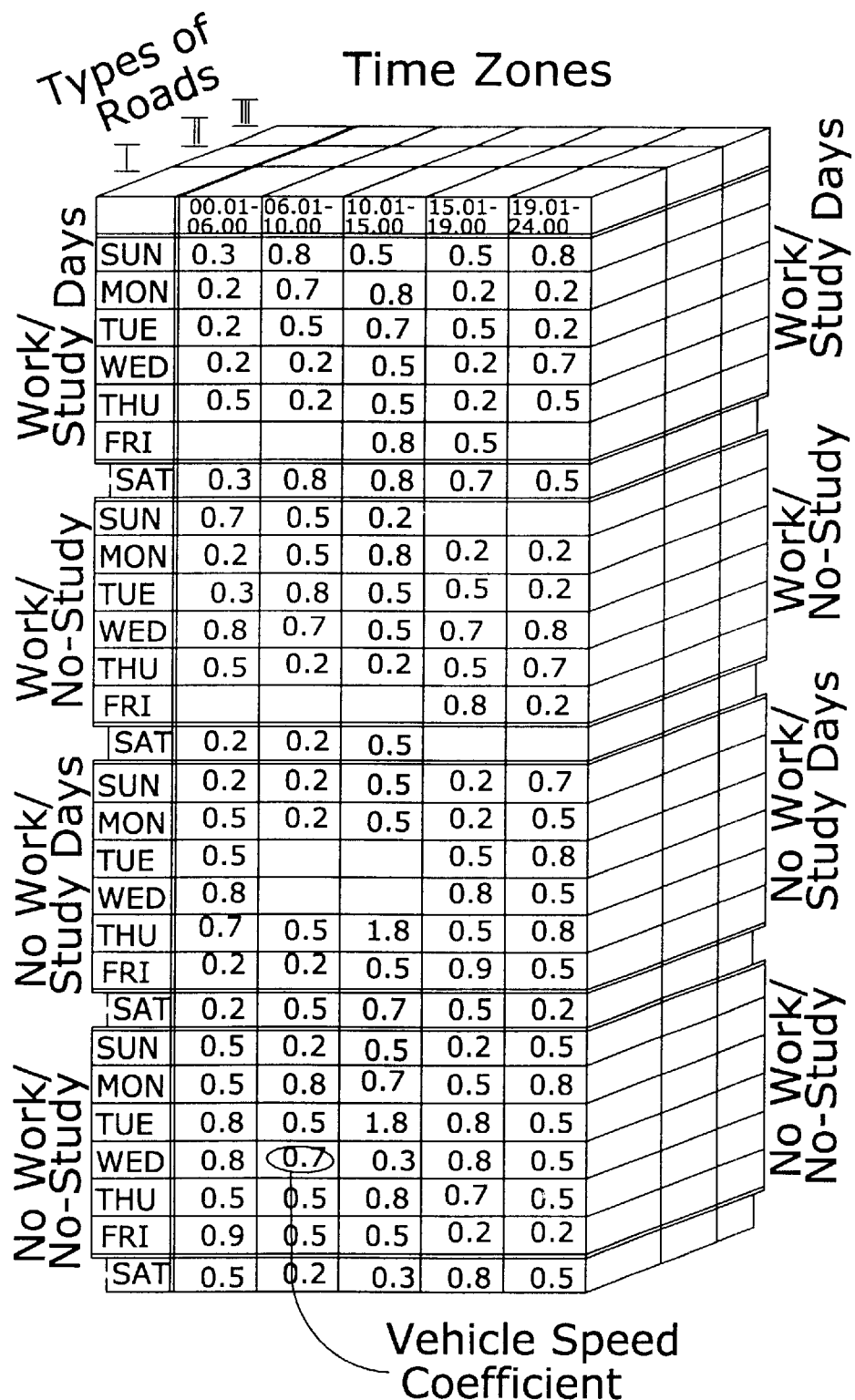
FIG. 16 is Table of Administrator for Category B Roads.

The CTU monitors all SMU vehicles and registers their travel times along a sample of sections of roads by processing their GPS signals. Thus obtained empirical, or regular, travel times are averaged, transformed into empirical speed coefficients and stored in the central database as attached to all sections of roads according to a number of categories: type of road, day of the week, month in the year (this may help to account for seasonal changes between summer and winter etc.), various combinations of working days or holidays, holidays for students and school pupils, time of the day. FIG. 15 and FIG. 16 called Tables of Administrator show the basic structure of this part of the CTU database.

Figure 17:
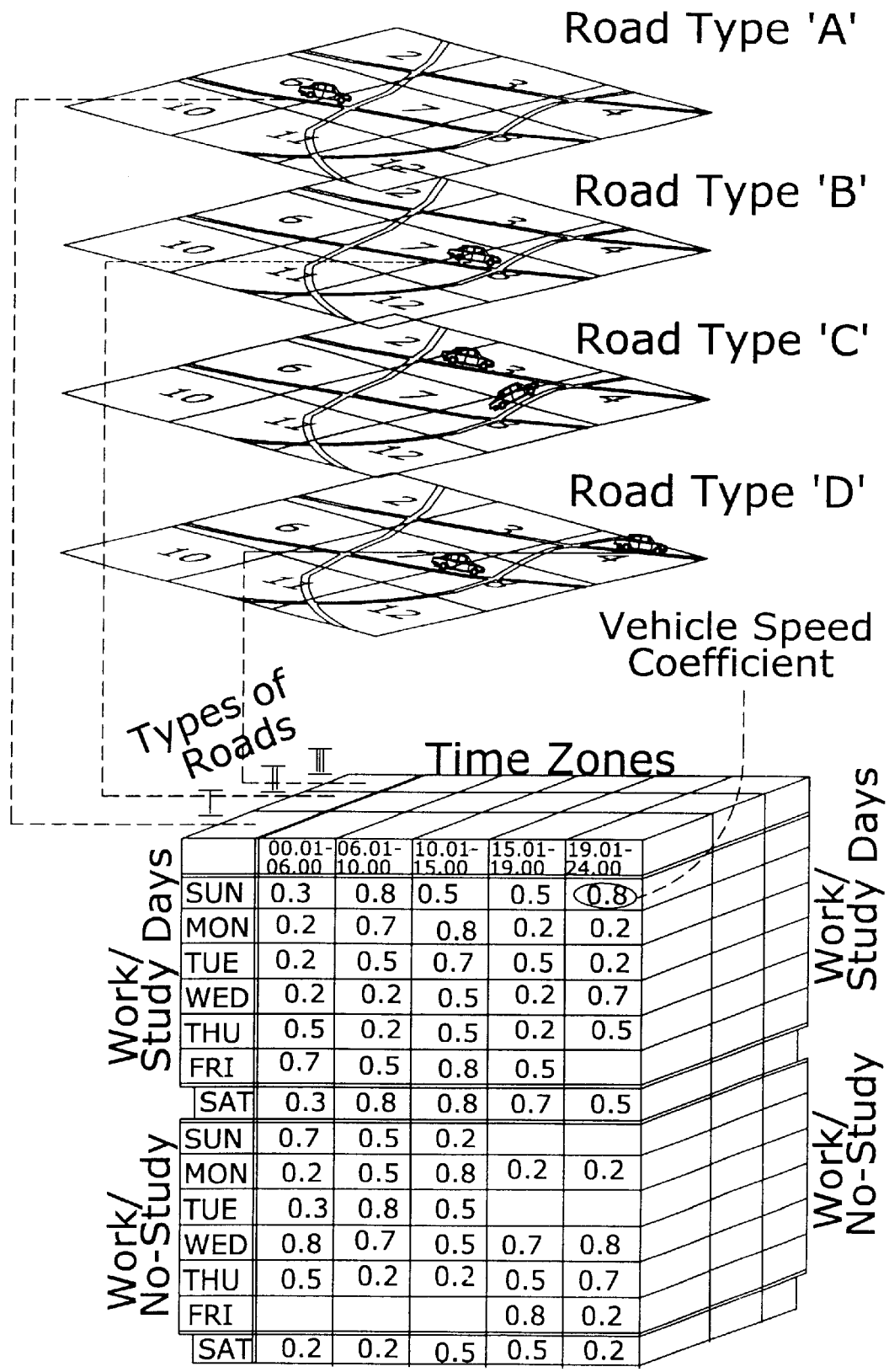
FIG. 17 shows the Multilevel Road Information Gathering System.

When sufficient data have been accumulated for accurate enough estimation of mean (regular empirical) travel times for each individual section in category A and for each class in category B, the CTU is able to provide those regular empirical travel times rather than theoretical travel times TTT (see FIG. 17).

Current Travel Times

As indicated above, the present Guidance System makes real time monitoring of all roads in category A and stores thus obtained data in special data structures associated with those roads. Those data structures contain Exit Lists (EXL), i.e. actual travel times registered for a number of vehicles that have recently traveled along this section. EXLs of sections of roads are multicasted at short time intervals from CTU to end-user databases and are available for use by their route-finding routines. How these EXLs are created and updated is described below whereas here we explain how they are used for route planning.

Figure 13:
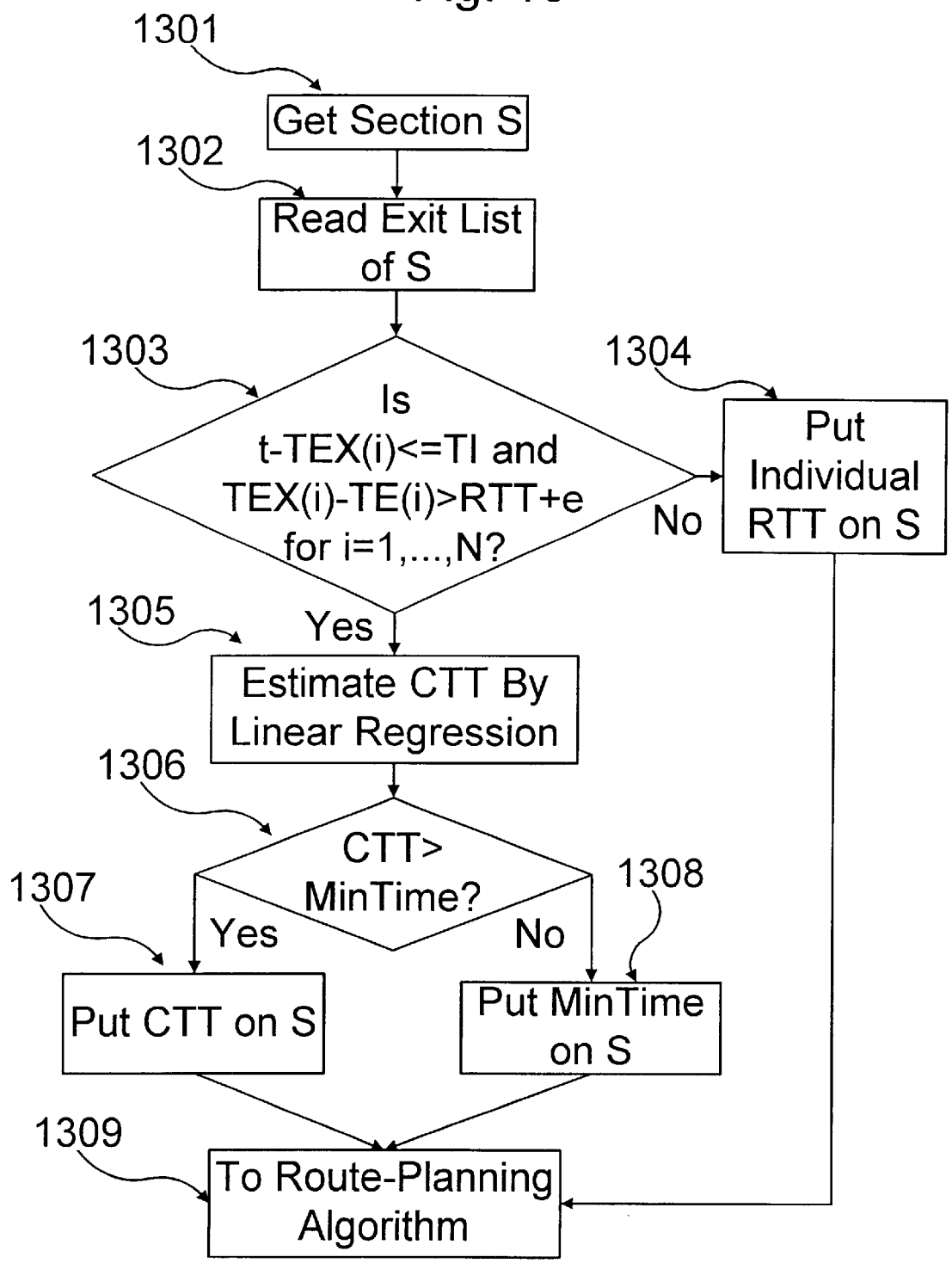
FIG. 13 shows Calculations of Travel Times in Category A Roads.

When the section travel time managing algorithm (FIG. 7) needs to calculate the travel time for a section S in Unit 5, it calls the procedure shown in FIG. 13.

FIG. 13 describes Calculations of travel times in category A roads. Unit 1: Get a section S (in category A) to be processed. Unit 2: Read the EXL associated with section S. Unit 3: The goal here is to detect bottleneck situations, and to modify estimated Current Travel Time (CTT) accordingly. The criterion for using CTT rather than Regular Travel Times (RTT) for various sections is that EXL contains recent enough data. If 1) latest n vehicles on EXL have left section S within predetermined Time Interval (TI) (short enough to consider the detected bottleneck to be current), and 2) each of them has spent considerably more time on S than the corresponding RTT, then the situation can be interpreted as a bottleneck on the section S.

Let t denote the time the vehicle under discussion is expected to commence traveling on S, TE(i) and TEX(i) the entry and exit times respectively for each vehicle V(i), i=1, 2, . . . , N, on the EXL, and the value e denote a significant change between RTT and the observed travel time (say, e=10% of RTT). Then for each vehicle V(i) on EXL we check two conditions:

$$t-TEX(i)<=TI \qquad 1)$$

and $$TEX(i)-TE(i)>RTT+e. \qquad 2)$$

If all these 2n conditions are satisfied, the CTT is predicted by the linear regression technique (Unit 5), otherwise the RTT in the database is used in computations (Unit 4). Unit 5: Since a bottleneck situation has been detected, the CTT is estimated as a predicted value at the time point t for the vehicle under discussion. This prediction is based on linear regression (see the regression-based prediction of current travel times below). Unit 6: Here a check is made whether the regression estimated time is reasonably large, i.e. is greater than MinTime where MinTime is the shortest time needed for traveling on section S. If CTT is greater than MinTime, then CTT will be used in computations (Unit 7), otherwise the MinTime will be used (Unit 8). After the current travel time has been estimated in either Unit 4, or Unit 7, or Unit 8, the control is transferred to the route-planning algorithm in Unit 9.

Figure 18:
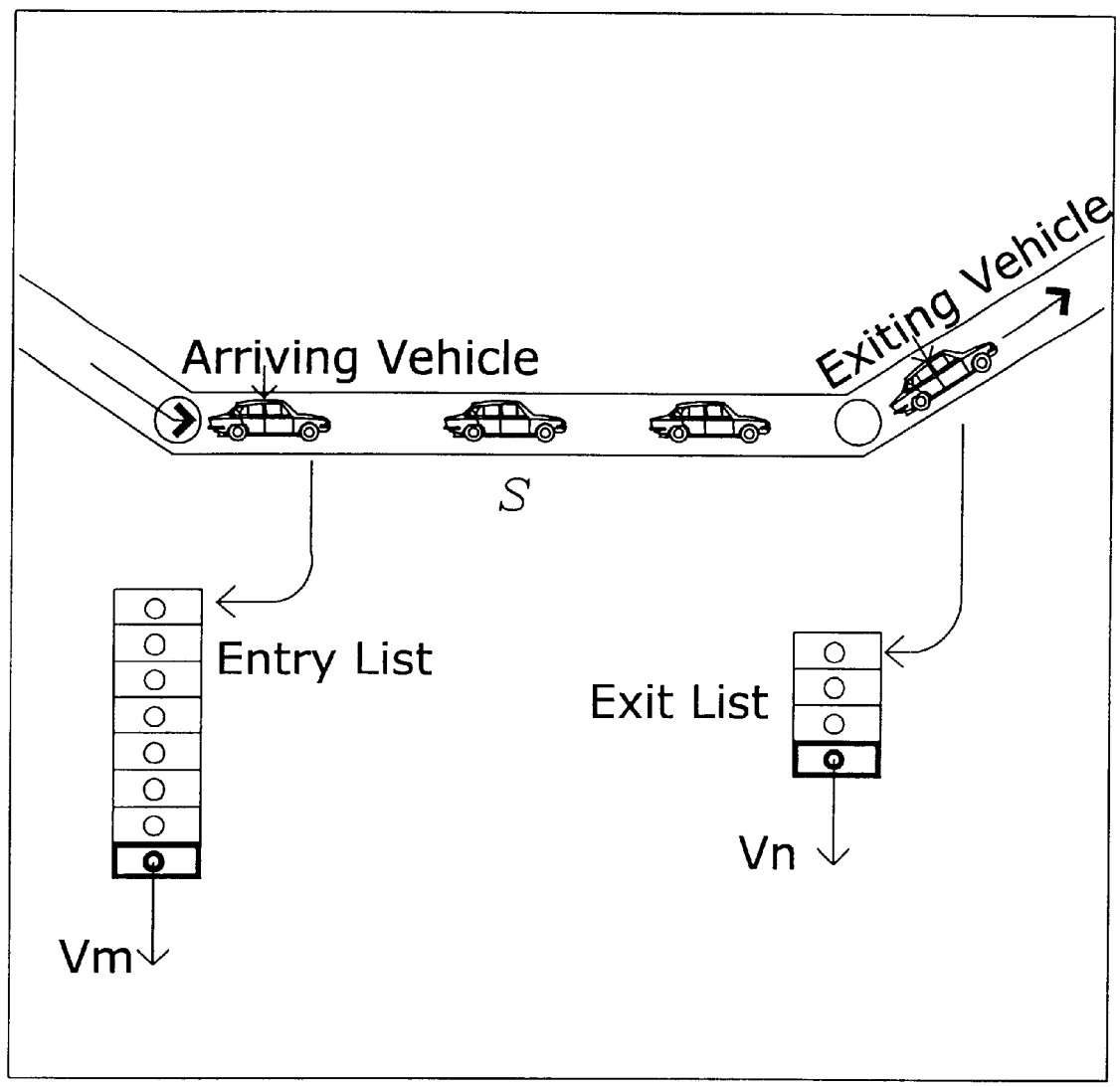
FIG. 18 shows the Method of Maintaining Two Lists of Vehicles.

Now we describe the data structures associated with sections in category A. Each such data structure related to a particular section S consists of two lists of sample vehicles as shown in FIG. 18. The first list, Entry List (EL), contains all the sample vehicles presently traveling on this section of the road identified by their IDs together with their TEs. The second list, EXL, represents a queue of the latest n vehicles' TEXs (optionally, n is set equal to 3) that already left section S. The CTU stores their ID's together with their TEs and their TEXs. The two lists are updated as follows: When a vehicle enters section S, it is put on EL of S together with its TE. When a vehicle leaves S, it is removed from EL of S and is put last on EXL of S together with its TE and TEX. Simultaneously, the first vehicle in the queue is removed from EXL.

Figure 19:
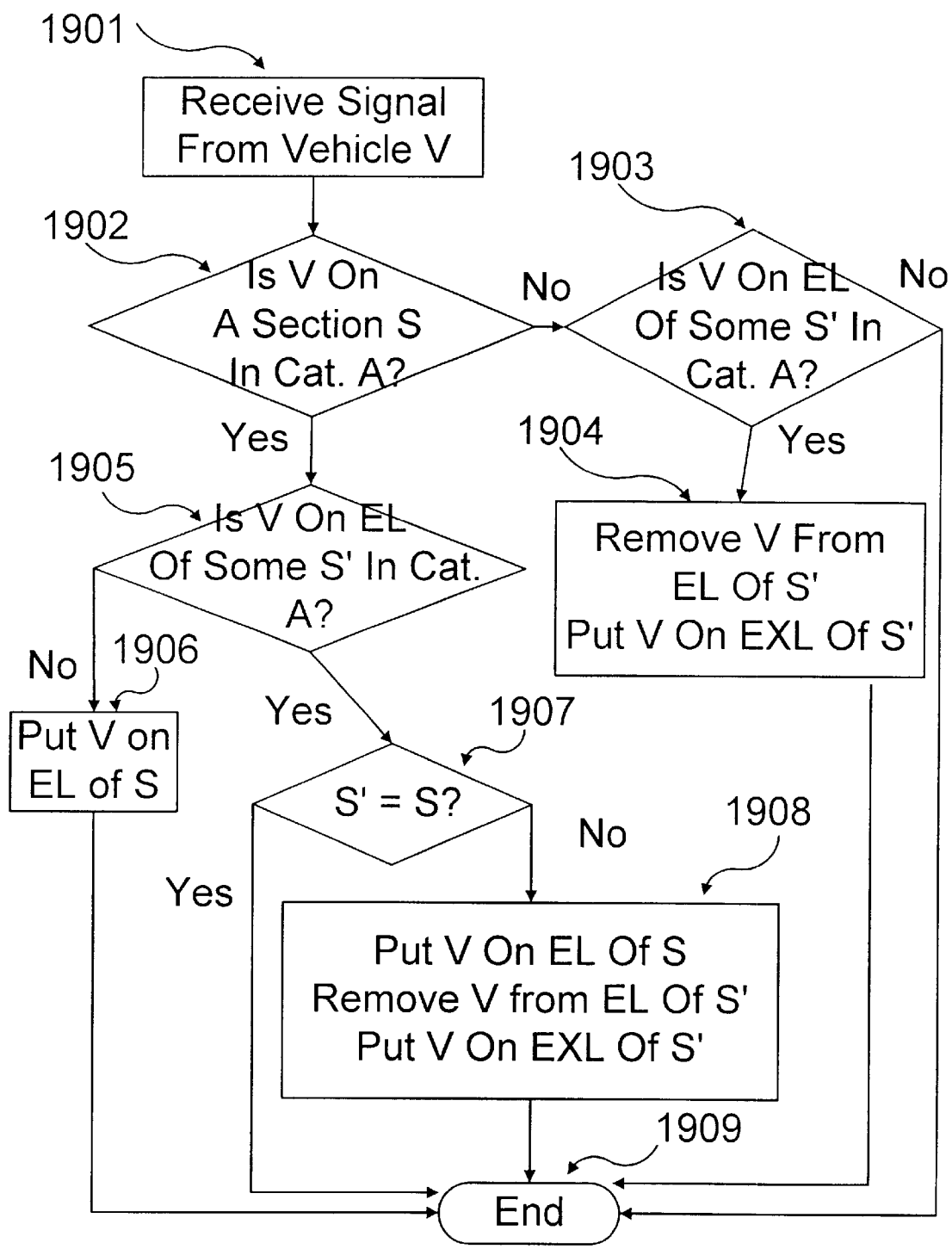
FIG. 19 shows the Algorithm for Maintaining Two Lists of Vehicles for Category A Sections.

FIG. 19 presents the Algorithm for Maintaining Two Lists of Vehicles for Category A Sections. After receiving signal from a vehicle V in Unit 1, Unit 2 tests whether it is located on some section S in category A. If so, Unit 5 tests whether V has already been on the EL of some section S' in category A (which might be section S itself). If yes, it is tested whether S is identical to S' (Unit 7). If S is not identical to S', then the lists of both sections S and S' are updated accordingly in Unit 8. If, on the other hand, S is identical to S' which means that V continue traveling on S, then nothing should be done and the computations stop in Unit 9. In Unit 5, it is checked if V has not previously been on the EL of any section in category A (which means V has traveled along a category B section). V is then put on the EL of S in Unit 6.

Returning to Unit 2, if V is not on a category A section (which means that V is on a category B section), it is checked whether V has previously been on the EL of some section S' in category A (Unit 3). If yes, both lists of section S' are updated accordingly in Unit 4, and if no (which means that V has passed from a section in category B to a section in category B, or simply continues traveling along a category B section), the computation is discontinued (Unit 9).

The above construction might be inefficient for sections of considerable length for which traveling could take a long time. In such cases, considerable delays in measuring travel times could cause time estimates to be obsolete by the time they have been computed. Still, the described method can be amended (without attempting to measure vehicle speeds in traffic jams) as follows. A long section is cut into two artificial subsections and a dummy intersection is introduced between them. The two lists as described above are maintained in the database for each subsection. The traveling times for the subsections will be reduced by half, and more accurate estimates could be obtained.

Figure 20:
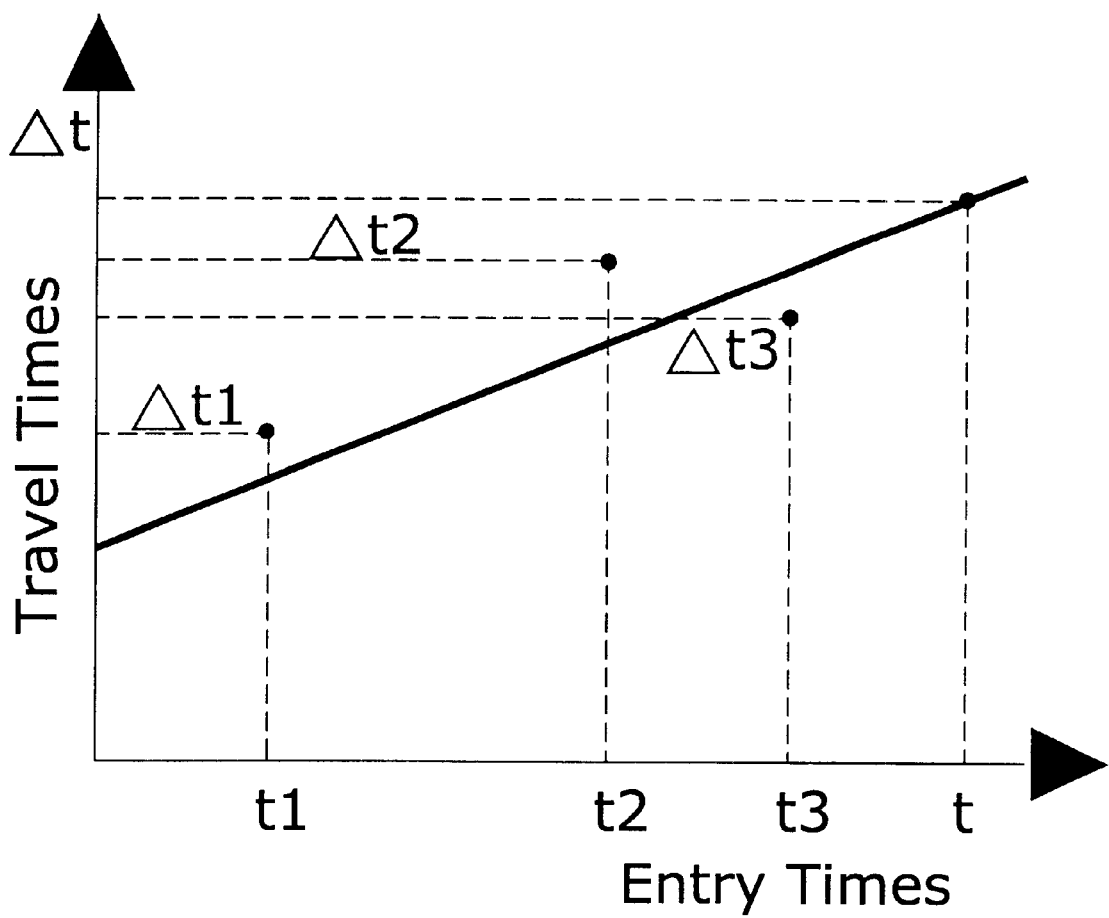
FIG. 20 illustrates Regression-Based Prediction of Current Travel Times.

Regression-Based Prediction of Current Travel Times presented in FIG. 20 is performed as follows:

Assume that the EXL contains n travel times $t(1)$, $t(2)$, ..., $t(n)$, and let $TE(1)$, $TE(2)$, ..., $TE(n)$ and $TEX(1)$, $TEX(2)$, ..., $TEX(n)$ be the corresponding entry times and exit times respectively $t(i)=TEX(i)-TE(i)$.

Also assume that the entry times are ordered increasingly: $TE(1)<TE(2)<...<TE(n)$. Then compute a linear regression of the travel times $t(1)$, $t(2)$, ..., $t(n)$ on the entry times $TE(1)$, $TE(2)$, ..., $TE(n)$, and estimate the CTT t as a predicted value at point t.

Computation of Optimal Routes

Principally, search for optimal (shortest) route on a graph of roads could be done by using the algorithm A* developed in the field of Artificial Intelligence (Hart P. E., Nilsson N. J., and Raphael B. (1968). A formal basis for the heuristic determination of minimum cost paths. IEEE Trans. Syst. Science and Cybernetics, SSC-4 (2), 100–107). For problems such as this one it is known to be superior to Dijkstra's algorithm often used for similar purposes.

In the present invention, algorithm A* is applied to travel times not distances. As indicated above, when feasible, current travel times are being used as a basis for forecasting future travel times, see FIG. 21. Assume that the current section S being considered by algorithm A* is section r6. The (future) travel time r6 for S is to be predicted by the linear regression method based on the TEXs supplied by the latest three vehicles that traveled on r6 (see $1^{st}$ table in FIG. 21).

Let TE(r6) be the entry time to section r6 for our vehicle V, and TEX(r6) its exit time for r6 predicted by linear regression. Then prediction of the travel time for V for section r7, say, is based on TEX(r6) as the TE for section r7 and the exit list EXL associated with section r7. This process is repeated for all sections that are being considered by algorithm A* until an optimal travel route and corresponding travel time have been calculated.

Still, due to enormous number of S sections of roads even in a moderately large geographical area (tens of thousands, hundreds of thousands, or even millions), more intelligent and domain-specific algorithm seems to be preferable. In particular, it appears that to simplify the search, a hierarchy of road layers should be created such as interstate and state highways at layer 1, national highways and major streets at layer 2, and local streets at layer 3.

In the present invention, we propose a new method for route planning called the algorithm Z. It utilizes stratification of road network into a hierarchy of layers, executes searches separately on each layer, and then combines the obtained results to produce a solution route, which leads to considerable reduction in search times.

For simplicity of presentation, assume that there are only two layers: upper layer containing large roads, say, interstate highways, and lower layer containing smaller roads, say, state roads. A search for optimal route begins by setting the origin and the destination points denoted by SP and DP respectively.

Figure 22:
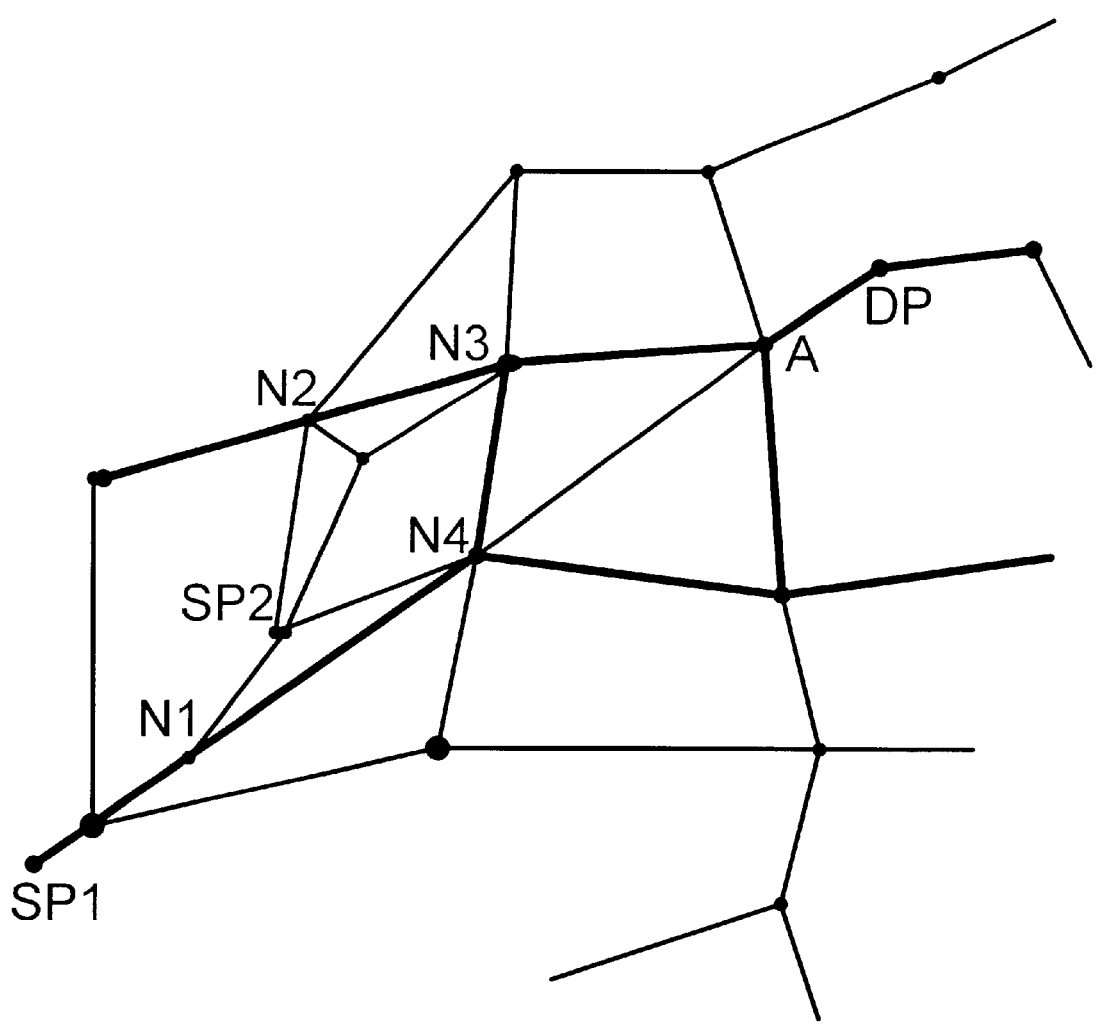
FIG. 22 shows Algorithm Z for Planning in Two-Layer Hierarchical Model.
Figure 23:
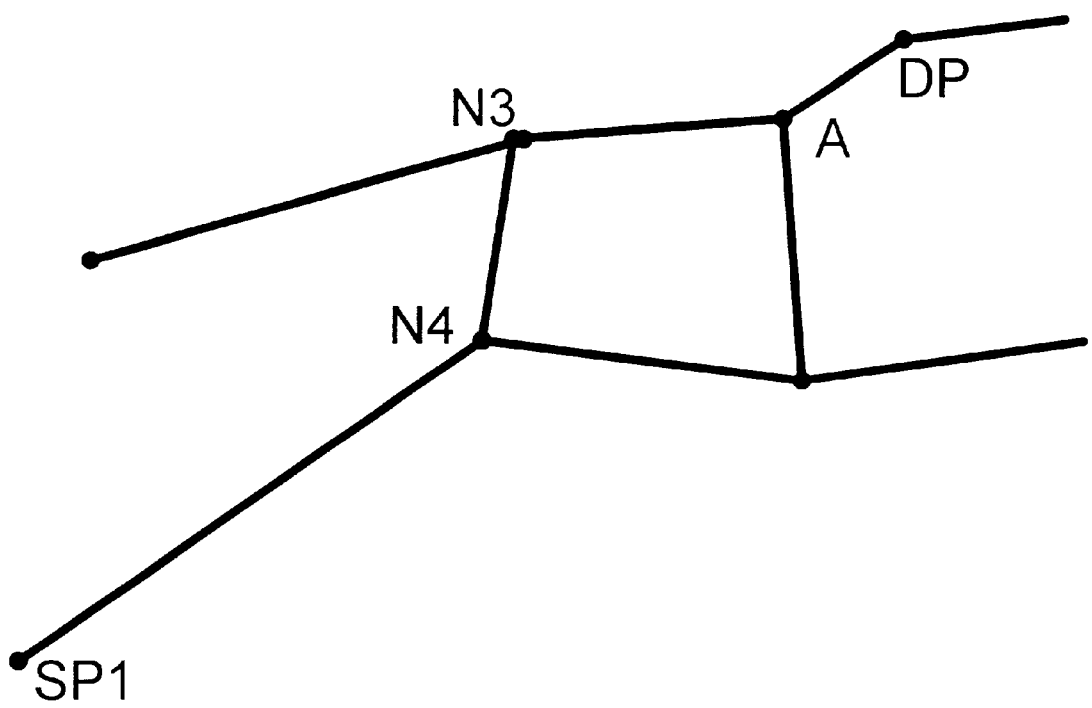
FIG. 23 shows the Algorithm Z for Planning at Upper Layer.

First consider a case when both SP and DP are on large roads: see origin point SP=SP1 and destination point DP in FIG. 22. In this case the algorithm A* is run on the network of large roads, see FIG. 23, and the obtained solution (SP1, N4, N3, A, DP) is the desired route.

Figure 24:
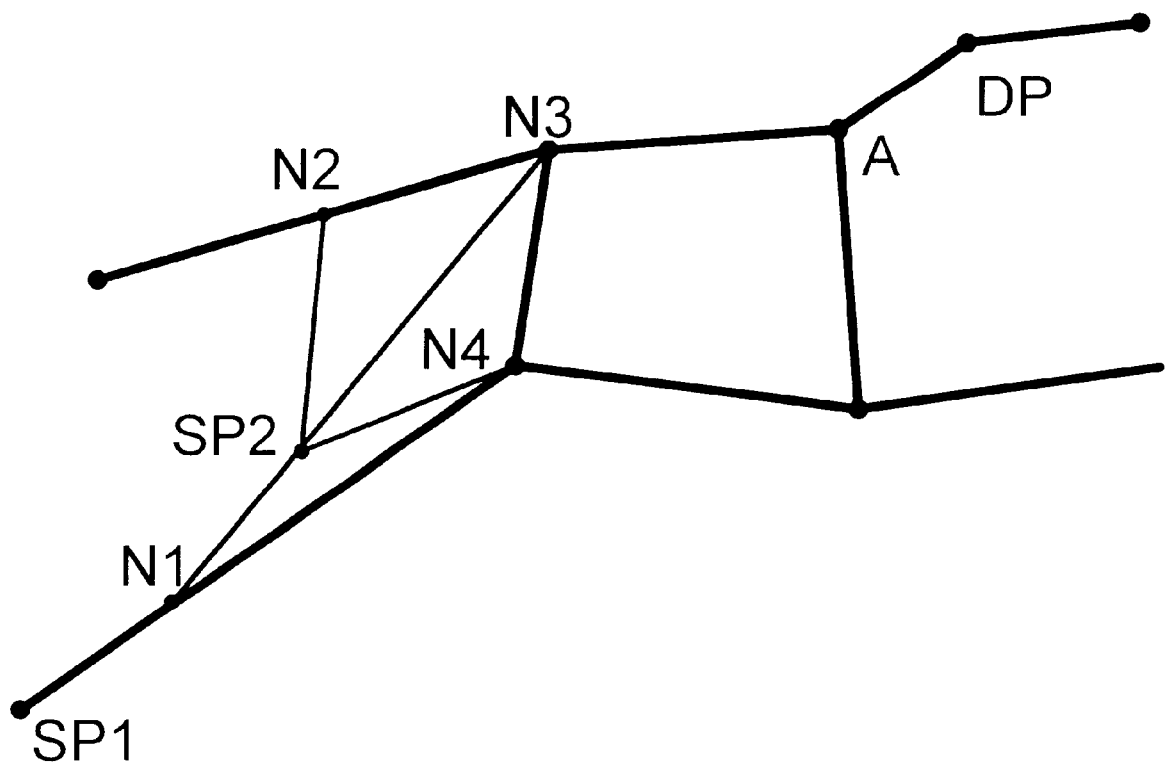
FIG. 24 shows the Algorithm Z for Planning at the Extended Road Network.

Now consider a case when at least one of the points SP or DP is not on a large road: see the origin point SP=SP2 on a small road and the destination point DP on a large road in FIG. 22. Then a node N on a large road is called a neighbor of SP if the shortest path from SP to N consists of sections of small roads alone (no sections of large roads). In FIG. 22, the neighbors of SP2 are the four nodes N1, N2, N3 and N4. For SP2 and each of its neighbors, we can construct a dummy arc with the length equal to the shortest path between them. These dummy arcs for all neighbors of SP are added to the network of large roads, which thereafter is called the extended network, see FIG. 24. These dummy arcs may or may not coincide with real sections on the map. For instance, the dummy arc (SP2, N3) in FIG. 24 does not coincide with any real section although its length is equal to the shortest path from SP2 to N3. Now running algorithm A* on the extended network, we obtain the shortest path (SP2, N3, A, DP) from SP2 to DP where (SP2, N3) is a dummy arc from SP to its neighbor N3, and (N3, A, DP) is a real path on the network of large roads. Finally, we replace the dummy arc (SP2, N3) by the corresponding shortest path from SP2 to N3 on small roads found by A* in a separate search, and combine the two paths to obtain the solution. The case when the destination point is not on a large road is treated similarly.

Figure 25:
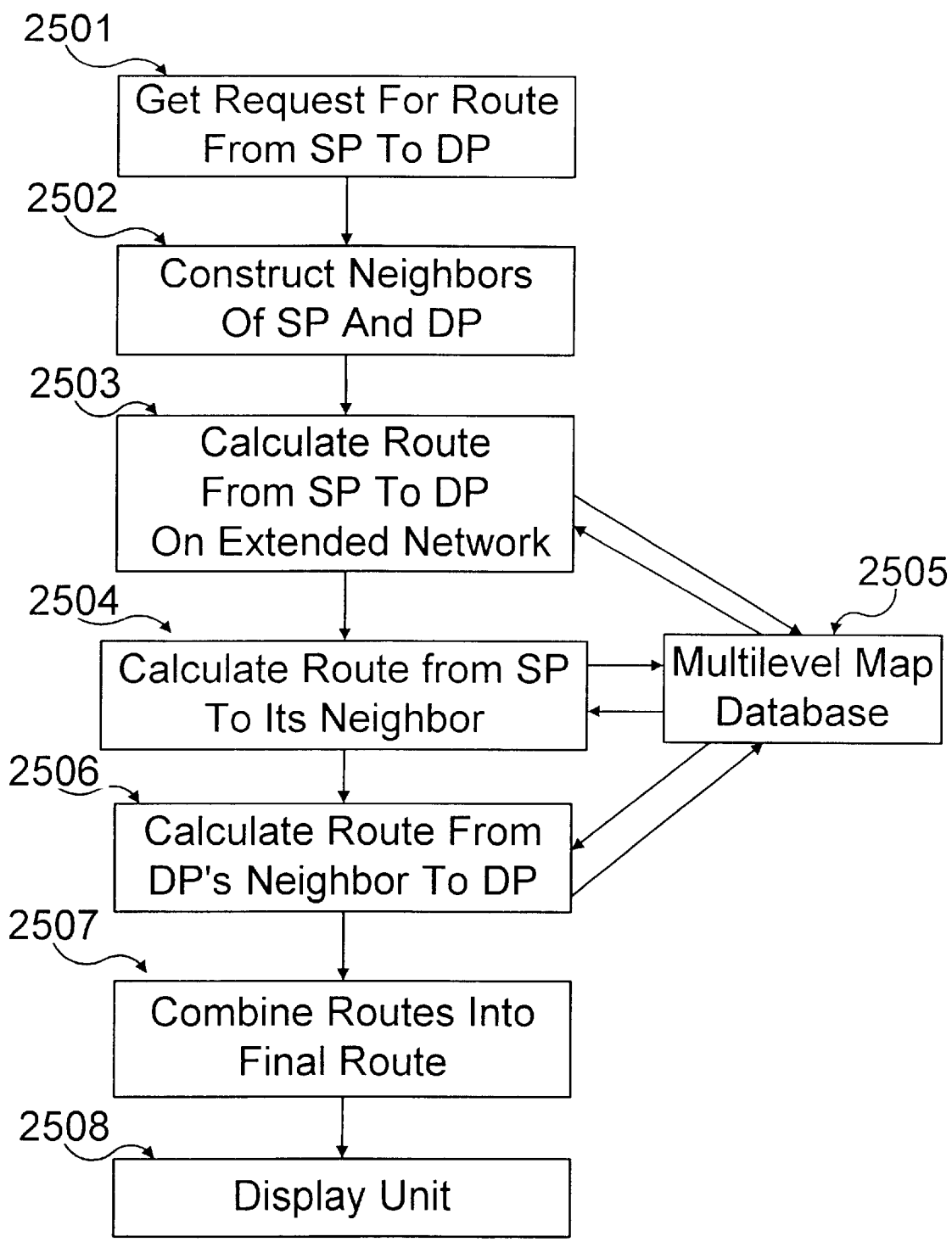
FIG. 25 shows the Flowchart of Algorithm Z for Route Planning.

FIG. 25 shows the flowchart of algorithm Z. A request for optimal route from the origin point SP to the destination point DP is received from the user in Unit 1. In Unit 2, the origin and destination points are checked to be located on large roads; if they do not, their neighbors are constructed and added to the network of large roads to make an extended network. In Unit 3, an optimal route from SP to DP is calculated on the extended network by algorithm A*. In so doing, the multilevel map database is queried for updated travel times (Unit 5). In Unit 4, an optimal route from SP to one of its neighbors is calculated by algorithm A* on the network of small roads. Similarly, in Unit 6, an optimal route from a neighbor of DP to DP is calculated. The obtained routes are combined into the final route in Unit 7, which is passed to the user in Unit 8.

Note 1. The method may be readily extended to cases in which there are more than two layers of roads.

Note 2. It is easy to construct mathematical examples when the above method may produce suboptimal solutions. In the example in FIG. 22, the passing by a small road from N4 to A has never been considered by algorithm Z. Still, it appears that for real maps such cases are extremely rare, and even when they happen, the losses of optimality will be negligible.

Patent Refinements and Future Embodiments

In the present invention, only sample vehicles SMUs are equipped with RF wireless transmitters in order to reduce overall costs and information overloads. Consequently, only the SMU vehicles are in direct communication with the CTU. Obviously, greater number of sample vehicles would enable better and more precise data collection. In future, it is intended to utilize the client CMU vehicles as part of the sample traffic data.

In IP-multicast configurations, such as One-to-Many (1toM) and Many-to-One (Mto1), it may be possible to obtain client vehicle current GPS locations via IP-Multicasting Multicasting 'confirmation' protocol. This is achieved by two-way exchange between CTU and the client vehicles (1toM), without the RF transmitter units and with only passive involvement by the client CMU units.

The CTU unit initiates both the updates of traffic data to specific groups of CMU vehicles (1toM) and the collection of the GPS data from these vehicles via (Mto1) 'confirmation' protocol. The GPS data from client vehicles CMUs can then be processed in CTU unit and included in all the statistical and real time traffic calculations together with the SMU sample data.

The 'confirmation' protocol can also facilitate all group-related traffic updates: the CTU database receives updates on GPS positions, directions of all the vehicles etc. in real time that are traveling in a specific geographical zone.

By identifying zones of unusual traffic activities and large concentrations of client vehicles, the CTU may give higher priority to IP-multicast update to one group, while delaying broadcasts to another group. It would also be desirable to stagger the multicast updating at the source at say a 1-minute delay to each subsequent group so that continuous data transfer is enabled. In this manner, a flexible multicasting application may be developed to control CTU data transfer to individual groups and provide more efficient and intelligent information management.

The IP-Multicast confirmation capabilities could further allow for individual client requests directly to and from CTU database. The client could initiate queries to the CTU such as real time information on favorite restaurants, clubs, sports facilities etc. directly from CTU rather then the more limited on-vehicle databases. Similarly, the driver may select A/V broadcast, lecture etc. available in the CTU broadcasting library but due to large memory requirements not available on the CMU unit.

GPS tracking capability of client vehicles CMUs individually could also enable various conventional security-related applications such as vehicle monitoring, warning and alarm systems without RF transmitters, as long as the vehicle modem is on stand-by.

Statistical Information Gathering for Government Road Design and Traffic Planning Agencies This embodiment would consist of statistical traffic reports and data collection of vehicle movements along federal, state, municipal and rural regional road networks. At present, these agencies rely mostly on extensive manpower resources as well as other mechanical installations to obtain statistical traffic data.

It is proposed here, to use the travel time information obtained by IMU sample vehicles to enable studies of long-term traffic data and their accumulated effects on optimal traffic flows in specific geographical regions. For this application it would be useful to develop correlation between vehicle travel times on specific road section and the number of vehicles traveling in that road section at a given time period. However, while in the current patent only the most recent traffic information is retained in the CTU database, this application could classify and tabulate traffic data in each zone and produce daily, monthly and yearly traffic charts. The statistical traffic reports can then be made accessible to all the agencies mentioned above, as well as to public in general via electronic and other media publications.

In another patent refinement, all potential users, trip planners and drivers could also access the online Guidance System via Internet browsers. These Internet users could receive the shortest path solution by entering the SP and destination DP point. The real time guidance could be made available in number of geographical regions depending on distribution and availability of sample vehicles in that region. In regions where the real time jam information is temporarily not available, the user could still receive the shortest route based on statistical traffic data.

Online Traffic Accidents and Weather Reports

In this refinement, the CTU database administrator can utilize most recent information on various traffic accidents and road disturbances reported by reliable sources. These are generally reported as static news items and presented in various formats. The administrator can enter this data directly into the CTU database together with the geographical location, time of the event, expected duration etc. Similarly, the administrator can record all weather reports and road conditions as related to specific regions. This data can then be included in the IP-multicast update to specific zones together with other traffic data as a part of regional or zone traffic report. In additional refinement, specific road disturbances such as road accidents or road conditions could also be entered automatically in real time, into the CTU database after appropriate verification, and data translation. The specific road sections where these accidents occurred would be updated automatically and new time coefficients temporarily altered according to a predetermined rating system. Once the road is cleared and report is verified, the original road ratings could be restored to previous status. While the management of large amounts of temporary traffic data could be rather involved, the improvement of updating capabilities would be dramatic, especially in zones with large number of road incidents and frequent weather changes.

Patent Refinements and Future Embodiments

In the present invention, only sample vehicles SMUs are equipped with RF wireless transmitters in order to reduce overall costs and information overloads. Consequently, only the SMU vehicles are in direct communication with the CTU. Obviously, greater number of sample vehicles would enable better and more precise data collection. In future, it is intended to utilize the client CMU vehicles as part of the sample traffic data.

In IP-multicast configurations, such as One-to-Many (1toM) and Many-to-One (Mto1), it may be possible to obtain client vehicle current GPS locations via IP-Multicasting 'confirmation' protocol. This is achieved by two-way exchange between CTU and the client vehicles (1toM), without the RF transmitter units and with only passive involvement by the client CMU units.

The CTU unit initiates both the updates of traffic data to specific groups of CMU vehicles (1toM) and the collection of the GPS data from these vehicles via (Mto1) 'confirmation' protocol. The GPS data from client vehicles CMUs can then be processed in CTU unit and included in all the statistical and real time traffic calculations together with the SMU sample data.

The 'confirmation' protocol can also facilitate all group-related traffic updates: the CTU database receives updates on GPS positions, directions of all the vehicles etc. in real time that are traveling in a specific geographical zone.

By identifying zones of unusual traffic activities and large concentrations of client vehicles, the CTU may give higher priority to IP-multicast update to one group, while delaying broadcasts to another group. It would also be desirable to stagger the multicast updating at the source at say a 1-minute delay to each subsequent group so that continuous data transfer is enabled. In this manner, a flexible multicasting application may be developed to control CTU data transfer to individual groups and provide more efficient and intelligent information management.

The IP-Multicast confirmation capabilities could further allow for individual client requests directly to and from CTU database. The client could initiate queries to the CTU such as real time information on favorite restaurants, clubs, sports facilities etc. directly from CTU rather then the more limited on-vehicle databases. Similarly, the driver may select A/V broadcast, lecture etc. available in the CTU broadcasting library but due to large memory requirements not available on the CMU unit.

GPS tracking capability of client vehicles CMUs individually could also enable various conventional security-related applications such as vehicle monitoring, warning and alarm systems without RF transmitters, as long as the vehicle modem is on stand-by.

Statistical Information Gathering for Government Road Design and Traffic Planning Agencies This embodiment would consist of statistical traffic reports and data collection of vehicle movements along federal, state, municipal and rural regional road networks. At present, these agencies rely mostly on extensive manpower resources as well as other mechanical installations to obtain statistical traffic data.

It is proposed here, to use the travel time information obtained by IMU sample vehicles to enable studies of long-term traffic data and their accumulated effects on optimal traffic flows in specific geographical regions. For this application it would be useful to develop correlation between vehicle travel times on specific road section and the number of vehicles traveling in that road section at a given time period.

However, while in the current patent only the most recent traffic information is retained in the CTU database, this application could classify and tabulate traffic data in each zone and produce daily, monthly and yearly traffic charts. The statistical traffic reports can then be made accessible to all the agencies mentioned above, as well as to public in general via electronic and other media publications.

Future Adaptation of the Route Planning Guidance System in a Mobile Wireless Internet Environment GSM Cellular positioning will soon be widely available on the world market. It will be available globally; it works with newest WAP platform phones as well as standard phones without any modifications of existing digital networks, requiring no costly overlays or other hardware investments.

It can be coordinated worldwide from a remote central location. The existing communication network is functional in WAP applications and constantly developing with growing demand.

In view of the above it would seem advantageous to make available the Guidance System of the present invention to the mass-market hand-held wireless devices. In order to accomplish this, several changes would have to be incorporated into the present patent structure. Both the data processing and route planning previously executed at the CMUs are now transferred to the Internet server database.

The main load of processing data and computation of optimal routes now rests on the server. This will require expanded server capabilities and computation time. Due to frequent client requests and entries, a new information management application will have to be developed which will enable the CTU server to deal with increased information traffic.

Figure 26:
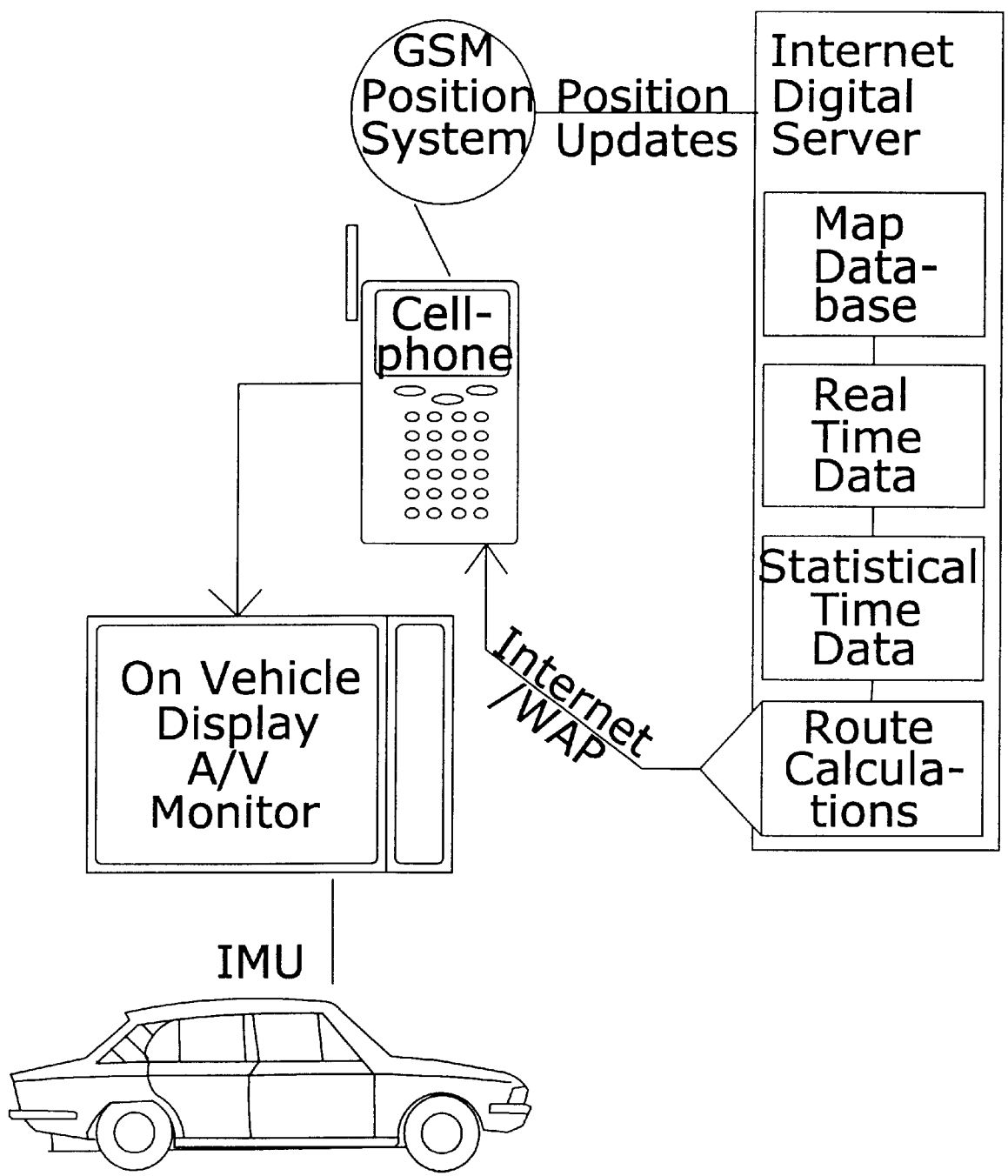

As pointed above, due to the limitations of all these wireless mobile units there is a growing need for introduction of new wireless application protocols such as WAP. Naturally, the WAP protocol requires adaptation of the communication modules and server applications. However, as this protocol becomes more widespread in the industry, seamless integration of the major functions of the proposed system will be achieved. FIG. 26 describes our Guidance System in Mobile Phone-Internet/WAP Configuration. GSM-based mobile phone development enables the transfer of position information within reasonable degree of accuracy and therefore can replace the previous GPS standard. By accessing this data, the Internet Server maintains database and can process all individual requests in real time. Calculated route is then transferred via Internet/WAP application code to the user. Due to the size limitations of the cell-phone LCD displays, it will be desirable to provide an independent on-vehicle A/V color monitor with full connection capabilities to the cell-phone.

It should be noted that in this refinement any client vehicle with a cell-phone can function as sample vehicle.

All potential clients and trip planners including usual WEB users can access the online Guidance System via Internet browsers. These WEB users could receive the shortest path solution by entering the origin SP and destination DP points. The real time guidance could be made available in number of geographical regions depending on distribution and availability of sample vehicles in that region. It is expected that the wide use of cell-phones will enable to significantly increase the size and geographical distribution of the sample vehicle fleet.

In regions, where the real time jam information is temporarily not available, the user could still receive the shortest route based on statistical traffic data.

Online Traffic Accidents and Weather Reports

In this refinement, the CTU database administrator can utilize most recent information on various traffic accidents and road disturbances reported by reliable sources. These are generally reported as static news items and presented in various formats. The administrator can enter this data directly into the CTU database together with the geographical location, time of the event, expected duration etc. Similarly, the administrator can record all weather reports and road conditions as related to specific regions. This data can then be included in the IP-multicast update to specific zones together with other traffic data as a part of regional or zone traffic report.

In additional refinement, specific road disturbances such as road accidents or road conditions could also be entered automatically in real time, into the CTU database after appropriate verification, and data translation. The specific road sections where these accidents occurred would be updated automatically and new time coefficients temporarily altered according to a predetermined rating system. Once the road is cleared and report is verified, the original road ratings could be restored to previous status. While the management of large amounts of temporary traffic data could be rather involved, the improvement of updating capabilities would be dramatic, especially in zones with large number of road incidents and frequent weather changes.

What is claimed is:

1. Multi-layer vehicular navigation system, where preferred starting point and destination point of the navigation route are significantly geographically different from each other, the system comprising:
   a wireless communications system for communicating with client vehicles, and a computer system operatively connected to the communications system, the computer system performing a hierarchically computed route search based on current and statistical section data by choosing roads with fastest classifications first, the computer system further combining data from intermediate layers subsequently and slowest rated roads last and then applying predicted road section coefficients corresponding to each route section;
   receiving device for collecting GPS data at predetermined time intervals from sample vehicles moving within a predefined geographical region;
   map database containing digital road maps of a predefined geographical region together with predetermined relevant data on road factors;
   said computer system operatively connected to the communications system capable of processing in real time said GPS data and transforming them into appropriately structured data suitable for being stored on the computer;
   a database suitable for storing and updating statistical data on traffic loads on individual roads;
   statistical application for collecting structured GPS data, computing individual statistical travel time estimates (regular times) for predetermined roads, and storing the results;
   statistical means application for periodical updating of the said statistical data using statistical criteria for determining volumes of data necessary for obtaining valid and reliable estimates; and
   computational tools for automatic identification of real time traffic jam conditions at various locations of the individual roads by utilizing the sample vehicles for measuring time delays.

2. The multi-layer vehicular navigation system of claim 1, comprising:
   receiving device for collecting GPS data at predetermined time intervals from a limited number of sample mobile units moving within a predefined geographical region;
   map database containing digital road maps of the entire predefined geographical region (country, state, etc.) together with predetermined relevant data on speed limits, road capacity, road category, one-way or two-way designations, entry and exit ramps, left and right turns, and other road factors;
   said computer system operatively connected to the communications system capable of processing in real time said GPS data and transforming them into appropriately structured data suitable for being stored on the computer hard disk and being retrieved for future use;
   a database suitable for storing and updating statistical data on traffic loads on a limited number of individual roads (defined as roads of category A), and also on all other roads (defined as roads of category B) which are classified according to the standard road classifications;
   table of administrator, said statistical data further subdivided into finer categories according to day of the week, hour of the day, etc., and stored accordingly;
   statistical application for collecting structured GPS data, computing individual statistical time travel estimates (regular times) for category A roads, and storing the results in the table of administrator according to said fine subdivisions;
   statistical application for collecting said structured GPS data, computing common statistical time travel estimates for category B roads (regular times), and storing the results in table of administrator according to said fine subdivisions;
   statistical means application for periodical updating of the said statistical data using statistical criteria for determining volumes of data necessary for obtaining valid and reliable estimates;
   computational tools for real time traffic jam identification at various locations of category A roads by utilizing the limited number of said sample vehicles that are used as "antennas" for measuring time delays due to road congestion;
   computational tools for dividing said geographical region into appropriate number of smaller geographical zones for the dual purpose of reducing volumes of traffic load data that will be broadcasted at predetermined time intervals to client vehicles, and for reducing the complexity of computations being made by on-vehicle computers;
   transmitting device for one-to-many IP multicasting of real time traffic load data updates to all registered clients;
   wherein multicasting of data is done on regional geographical basis according to said smaller geographical zones and is disseminated to end-users traveling within given geographical regions based on their GPS vehicle positions.

3. The multi-layer vehicular navigation system of claim 1, comprising limited but significant number of sample mobile units carrying GPS location units and RF transmitters for transmitting at predetermined time intervals their GPS data to CTU for further processing.

4. Client mobile unit guidance system for motor vehicles, the system comprising computing units capable of updating current travel times tables, predicted or estimated travel times tables and statistical travel times data tables continuously or according to predetermined time intervals from a central traffic unit, wherein the systems further includes:

receiving device for allowing collection of GPS data at predetermined time intervals from sample vehicles moving within a predefined geographical region;

map database containing digital road maps of a predefined geographical region together with predetermined relevant data on road factors;

said computer system operatively connected to the communications system capable of processing in real time said GPS data and transforming them into appropriately structured data suitable for being stored on the computer;

a database suitable for storing and updating statistical data on traffic loads on individual roads;

statistical application for collecting structured GPS data, computing individual statistical travel time estimates (regular times) for predetermined roads, and storing the results;

statistical means application for periodical updating of the said statistical data using statistical criteria for determining volumes of data necessary for obtaining valid and reliable estimates; and computational tools for real time traffic jam identification at various locations of the individual roads by utilizing the sample vehicles for measuring time delays, wherein the received data are used for estimating statistical models of traffic situations, and the client mobile units are provided with optimal travel routes based on those statistical models.

5. The client mobile unit guidance system of claim 4 wherein:

each of said client mobile units carries GPS location units, IP multicast receivers, on-vehicle computers, map databases, guidance software, and display units;

said IP multicast receivers are used for periodically receiving travel time traffic updates from CTU;

said guidance software is based on mathematical and Artificial Intelligence algorithms together with map databases for calculating fastest available travel routes from the present vehicle position to the desired destination while taking into account both statistical travel times and current travel times;

said travel time traffic updates from CTU are automatically entered in the database and the alternate travel route is proposed for the desired destination;

said statistical travel times are transferred from CTU to on-vehicle databases via multicasting, and said current travel times are calculated by on-vehicle computers using said guidance software;

calculation of said current travel times in traffic congestion is made directly by a special algorithm based only on said travel time traffic updates rather than using any vehicle speed estimates in traffic jams (as many if not all speed measurements may return zero values, thereby making the resulting estimates highly unstable and unreliable);

estimation of said current travel times for class A roads is based on regression prediction methods thereby enabling to detect increasing time delays when road congestion is growing, or alternatively, to detect decreasing time delays when road congestion is decreasing;

said fastest travel routes are calculated using said current travel times in the zones contiguous to the vehicle while using statistical travel times in the zones situated further from the vehicle because traffic jams far away from the present location of the vehicle may not be relevant for route planning at the given moment.

6. The system in claim 4 further comprising computing units capable of calculating an optimal fastest short and long range composite travel route for a predetermined extended time period corresponding to client's position or requested starting and destination points by calculating an optimal fastest short and long range composite travel route for a predetermined extended time period corresponding to client's position or requested starting and destination points.

7. The system in claim 4 further comprising computing units capable of calculating an optimal fastest short and long range composite travel route for 2 hours or more corresponding to client's position or requested starting and destination points by calculating an optimal fastest short and long range composite travel route for a predetermined extended time period corresponding to client's position or requested starting and destination points.

8. The system in claim 4 further comprising computing units capable of updating current travel times data in specified area only for current real time updates from the central traffic unit.

9. The system in claim 4 further comprising computing units capable of updating statistical travel times data in specified area only for current real time updates from the Central Traffic Unit.

10. The system in claim 4 further comprising computing units capable of updating standard travel times in specified area only for current real time updates from the central traffic unit.

11. The system in claim 4 further comprising computing units with multi-layer vehicular navigation capabilities the computing units including multi-layer vehicular navigation system, in which a preferred starting point and destination point of the navigation route are significantly geographically different from each other, the navigation system performing a hierarchically computed route search based on current and statistical section data by choosing roads with fastest classifications first, combining data from intermediate layers subsequently and slowest rated roads last and then applying predicted road section coefficients corresponding to each route section, wherein the client mobile unit obtains preferred starting and destination point from client input and performs multi-layer route search.

12. Method of operating a central traffic guidance unit comprising method of calculating an optimal fastest short and long range composite travel route for a predetermined extended time period corresponding to client's position or requested starting and destination points;

collecting GPS data at predetermined time intervals from sample vehicles moving within a predefined geographical region;

providing a map database containing digital road maps of a predefined geographical region together with predetermined relevant data on road factors;

processing in real time said GPS data and transforming them into appropriately structured data suitable for being stored on using a computer system operatively connected to a communications system;

storing and updating statistical data on traffic loads on individual roads;

subdividing said statistical data into subdivisions according to time factors;

collecting GPS data and computing individual statistical travel time estimates (regular times) for predetermined roads, and storing the results according to said subdivisions;

periodical updating of the said statistical data using statistical criteria for determining volumes of data necessary for obtaining valid and reliable estimates;

computing real time traffic jam identification at various locations of the individual roads by utilizing the sample vehicles for measuring time delays; and transmitting real time traffic load data updates.

13. The method of claim 12, wherein the extended time period is at least 2 hours.

14. The method in claim 12 further comprising measurements and calculations of longer-term traffic conditions and delays which may immediately influence the optimal route selection now and may require revision of the current travelling route accordingly.

15. The method in claim 12 further comprising mathematical optimization of estimated travel times, wherein the travel times in the current area are based on current time range within a first predetermined estimated travel time from the current position and are computed with data from a predetermined intermediate time range of travel and estimates consisting of travel times within a longer predetermined time range based on statistical travel times collected for that given period.

16. The method of claim 15 comprising determining the intermediate time range statistical predictions.

17. The method in claim 4 comprising mathematical optimization of estimated travel times, wherein the travel times in the current area are based on current time range within 20 minutes of the current position and are computed with data from intermediate 20 to 60 minutes travel range, corresponding to an intermediate geographical area, the intermediate travel range based on statistical predictions or other traffic delay reports and forecasted estimates consisting of travel times in 1 to 2 hour or longer range based on statistical travel times collected for that given period.

18. The method in claim 12 further comprising multistage calculations of optimal travel route based on accumulated time criteria algorithms in which different time ranges are used for searching for optimal route solutions at each different stage.

19. The method of claim 18, comprising obtaining the different time ranges used for searching for optimal route solutions at each different stage from predicted current travel times, statistical travel times and standard travel times.

20. The method in claim 12 further comprising continuous tracking sample data lists for each corresponding road section by maintaining current status Entry List classified by current IDs and entry times of all sample vehicles, past and current duration of travel on the given section, wherein Exit times of all sample (reporting) vehicles which left that road section within a given time interval are registered in Exit Lists containing also the vehicles IDs and past travel history interval with all appropriate travel times for statistical prediction computations.

21. The method in claim 12 further comprising short time range statistical estimates of current travel times for any road section wherein up to 20 minutes advanced statistical predictions are prepared by regressing a set of registered travel times of all vehicles on the corresponding Exit List on their registered entry times and making short time range statistical predictions of travel times for the corresponding road section within a given short time horizon.

22. The method in claim 12 further comprising establishing short time range statistical estimates of current travel times for a predetermined short time range by using statistical predictions obtained by regressing a set of registered travel times of all vehicles on a corresponding exit list based on their registered entry times.

23. The method in claim 12 further comprising:

establishing short time range statistical estimates of current travel times by using statistical predictions prepared by regressing a set of registered travel times of all vehicles on a corresponding exit list based on their registered entry times; and making short time range statistical predictions of travel times for the corresponding road section within a given short time horizon.

* * * * *